United States Patent [19]

Slongo et al.

[11] Patent Number: 4,880,859

[45] Date of Patent: Nov. 14, 1989

[54] LIGHT-STABILIZED STAR POLYMER MICROPARTICLES

[75] Inventors: Mario Slongo, Tafers; Jean Rody, Riehen; Franciszek Sitek, Therwil, all of Switzerland; Andreas Valet, Eimeldingen, Fed. Rep. of Germany

[73] Assignee: Ciba-Geigy Corporation, Ardsley, N.Y.

[21] Appl. No.: 202,741

[22] Filed: Jun. 3, 1988

[30] Foreign Application Priority Data

Jun. 4, 1987 [CH] Switzerland ................. 2114/87

[51] Int. Cl.$^4$ ................. C08K 5/34; C08K 5/13
[52] U.S. Cl. ................. 524/91; 524/99; 524/102; 524/103; 524/291; 524/336
[58] Field of Search ........... 524/91, 99, 102, 103, 524/291, 336; 525/902

[56] References Cited

U.S. PATENT DOCUMENTS

| | | | |
|---|---|---|---|
| 3,272,891 | 9/1966 | Millionis et al. | 524/91 |
| 3,318,866 | 4/1967 | Horton et al. | 524/291 |
| 3,342,850 | 9/1967 | Newland et al. | 524/291 |
| 4,264,678 | 4/1981 | Nelsen et al. | 524/902 |
| 4,414,372 | 11/1983 | Farnham et al. | 526/190 |
| 4,417,034 | 11/1983 | Webster | 526/190 |
| 4,419,471 | 12/1983 | Nelsen et al. | 525/902 |
| 4,508,880 | 4/1985 | Webster | 526/190 |
| 4,524,196 | 6/1985 | Farnham et al. | 526/190 |
| 4,618,638 | 11/1986 | Dexter et al. | 524/102 |
| 4,695,607 | 9/1987 | Spinelli | 525/293 |

FOREIGN PATENT DOCUMENTS

| | | |
|---|---|---|
| 0003166 | 7/1979 | European Pat. Off. |
| 0119051 | 9/1984 | European Pat. Off. |
| WO86/00626 | 1/1986 | World Int. Prop. O. |

OTHER PUBLICATIONS

Gomez, Polymer Preprints (Amer. Chem. Soc. Polym. Chem. Div.), vol. 28, No. 1 (1987), pp. 209–210.
Stinson, C & EN (4/87), pp. 43–46.

*Primary Examiner*—Veronica P. Hoke
*Attorney, Agent, or Firm*—JoAnn Villamizar

[57] ABSTRACT

Light-stabilized star polymer microparticles are described which are prepared with particular advantage by group transfer polymerization. The light stabilization is effected by carrying out at least a part step of the polymerization in the presence of a light stabilizer, for example a hindered amine or/and a UV absorber. With particular advantage, those light stabilizers are used which contain reactive groups in the molecule and, in this way, can be chemically incorporated into the polymer. The polymer microparticles show excellent light stability and are outstandingly suitable as constituents in coating compositions which can be processed, for example, to give coating films of high light stability.

29 Claims, No Drawings

LIGHT-STABILIZED STAR POLYMER MICROPARTICLES

The present invention relates to light-stabilized star polymer microparticles, to processes for the preparation thereof, to their use in coating compositions and to coating compositions which contain such microparticles, and also to the "living" microparticles obtained in the preparation of the star polymer microparticles.

Recently, due to the need to minimize pollution of the environment, there has been considerable interest, in coating technology, in increasing the proportion of the film-forming material present in the coating compositions and in reducing the proportion of inert liquid diluents which must be evaporated off during the preparation of the coating and during drying and curing.

Coating compositions with a high proportion of film-forming material have been disclosed, for example, in EP-A 3,166 and EP-A 119,051 and in the literature cited in each of these; they have in general the structure of a liquid continuous phase and a disperse phase which, if appropriate, contains a high proportion of insoluble polymer microparticles.

The resulting films and coatings have a composite character, namely a polymer matrix or a continuous phase derived from polymer which was originally in solution, and a disperse phase derived from the polymer microparticles.

WO-A-86/00,626 and US-A 4,695,607 have disclosed star polymer microparticles, including "living" microparticles, which can also be used for the purposes described above.

Coating compositions containing such microparticles, however, have only inadequate light stability, since hitherto only the coating mixture as such has been stabilized by physical admixture of a light stabilizer to the homogeneous liquid phase.

By contrast, the sometimes high microparticle proportion of such coatings is unstabilized.

It has now been found that the light stability of coatings and paints, in particular baking paints, containing a proportion of the said microparticles can be improved, if appropriate light stabilizers are incorporated into the microparticles and the latter are thus protected directly from weathering effects, in particular irradiation.

The present invention therefore relates, under a first aspect, to light-stabilized star polymer microparticles containing (a) a polymer core of 1-100% by weight of one or more monomers which contain at least 2 groups of the formula

(1)

and 0-99% by weight of one or more monomers which contain one group of the formula (1), and (b) at least 5 arms, fixed to the polymer core, of polymer chains consisting of one or more monomers which contain a group of the formula (1), R in the formula (1) being H, CH$_3$, CH$_3$CH$_2$, CN or COOR', Z$^1$ being O or NR' and R' being C$_1$-C$_8$alkyl, at least 50% of the microparticles having at least 5 up to 2,000,000 such arms, these arms consisting of one or more groups of different polymer types, and (α) the polymer chains of one of the said groups of arms having molecular weights which are the same as or different from those of the other groups, and being derived from the same monomers as the polymer chains of the other groups of arms, or from monomers differing from these, (β) the polymer chains of each group of arms having an arm polydispersity of 1.0 to 2.0, this polydispersity being defined by the weight average divided by the number average of the polymer chains in the group, and (γ) the star polymer microparticles themselves, which contain a core and arms consisting of one or more groups, having a polydisperity of 1.0 to 2.0, this polydispersity being defined by the weight average divided by the number average of the microparticles, which polymer microparticles contain 0.1 to 30% by weight, relative to the monomers employed, of one or more light stabilizer(s).

In particular, these microparticles have a polydispersity of the arms of 1.3 to 1.6 and a polydispersity of the total microparticles of 1.3 to 1.6.

Preferably, the microparticles described contain a single group or two groups of arms, especially 1 group of arms.

A further embodiment of the present invention relates to light-stabilized, soluble star polymer polymer microparticles containing (a) a crosslinked core containing a polymer of a mixture of 1-100% by weight of one or more monomers which contain at least 2 groups of the formula

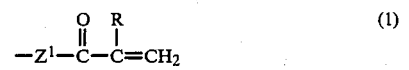
(1)

and 0-99% by weight of one or more monomers which contain one group of the formula (1), and (b) at least 5 arms, fixed to the polymer core, of polymer chains derived from one or more monomers which contain a group of the formula (1), R in the formula (1) being H, CH$_3$, CH$_3$CH$_2$, CN or COOR', Z$^1$ being O or NR' and R' being C$_1$-C$_8$alkyl, at least 50% of the microparticles having at least 5 up to 2,000,000 arms, the ratio of the number of arms to the number of bifunctional recurring acrylic units in the core being ≦1:1, and these polymer microparticles containing 0.1 to 30% by weight, relative to the monomers employed, of one or more light stabilizer(s).

Such microparticles are preferably obtained by means of a polymerization initiator in a molar initiator/bifunctional acrylic monomer ratio of ≦1:1, whereby a crosslinked core is formed without the reaction mixture gelling. "Soluble" is to be understood as meaning that nothing precipitates from a 1% solution in toluene, ethylene glycol dimethyl ether and/or tetrahydrofuran when the solution is centrifuged for 30 minutes at 17,000 r.p.m. Preferably, the arms solubilize the core.

The star polymer microparticles according to the invention are prepared with particular advantage by group transfer polymerization.

A particularly preferred embodiment of the present invention therefore relates to light-stabilized, "living" star polymer microparticles containing (a) a crosslinked core containing a polymer of a mixture of 1-100% by weight of a monomer having at least 2 C—C double bonds polymerizable by group transfer polymerization and 0-99% by weight of a monomer having one C—C double bond polymerizable by group transfer polymerization, (b) at least 5 arms fixed to the polymer core and containing polymer chains consisting of one or more monomers polymerizable by group transfer polymerization, and (c) "living" group transfer polymerization centres which are bonded to the core or/and to at least some of the arms and are capable of further polymerization, which polymer microparticles contain 0.1 to 30% by weight, relative to the monomers employed, of one or more light stabilizer(s); and also to star polymer microparticles obtainable by deactivation of the "living" microparticles described above by means of a reagent which deactivates the "living" groups of the group transfer polymerization centres. These deactivated polymer microparticles also contain 0.1 to 30% by weight, relative to the monomers employed, of one or more light stabilizer(s). These microparticles lack the above feature (c).

In the preparation of the microparticles according to the invention, at least part of the polymerization of the monomers is carried out in the presence of the light stabilizer(s).

Microparticles are here to be understood as meaning polymer particles of a size or size distribution within colloidal dimensions (for example about 0.01–20 μm), which particles are insoluble in the continuous liquid phase of coating compositions. The expression polymer microparticle is well known in coating technology and hence in the relevant literature. An essential feature of the microparticles, apart from their size, is that they contain or consist of a crosslinked core. In the ideal form, the microparticles have an approximately spherical shape. In place of the term "microparticle", the term "microgel" is also usual in the literature. Therefore, the microparticles according to the invention can also be described as light-stabilized polymer microgels. Both terms are used in the present application, and they are synonymous.

Examples of preferred monomers used for microparticles according to the invention and containing a C—C double bond, which is polymerizable by group transfer polymerization, are:

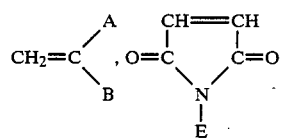

and mixtures thereof, in which A is CN,

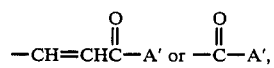

B is H, CH$_3$, CN or —COOE, with the proviso that, in the case of

B is H or CH$_3$, A' is —OSi(E$^1$)$_3$, —E, —OE or —NE'E", each E$^1$ independently of one another being C$_1$–C$_{10}$alkyl, C$_6$–C$_{10}$aryl or C$_1$–C$_6$alkyl-C$_6$–C$_{10}$aryl, E is C$_1$–C$_{20}$alkyl, C$_2$–C$_{20}$alkenyl, dienyl, C$_6$–C$_{20}$cycloalkyl, C$_6$–C$_{10}$aryl, C$_1$–C$_6$alkyl-C$_6$–C$_{10}$aryl or phenyl-C$_1$–C$_4$alkyl, it being possible for each of these radicals to contain one or more ether oxygen atoms in aliphatic moieties, functional substituents in such radicals being unreactive under the polymerization conditions, and E' and E" independently of one another are C$_1$–C$_8$alkyl.

Preferred group transfer catalyst centres in "living" polymer microparticles are those of the formula (E$^1$)$_3$M, in which E$^1$ is as defined above and M is Si, Sn or Ge.

With particular preference, the star polymer microparticles according to the invention contain (a) a core containing a polymer of a mixture of 1–100% by weight of a monomer having at least 2 C—C double bonds which are polymerizable by means of an initiator of the formula Q—Z, and 0–99% by weight of a monomer having one C—C double bond which is polymerizable by means of an initiator of the formula Q—Z, (b) at least 5 arms fixed to the polymer core and containing polymer chains consisting of one or more monomers polymerizable by means of an initiator of the formula Q—Z, and (c) groups of the formula Q—Z" bonded to the core or/and to at least some of the arms, these polymer microparticles containing 0.1 to 30% by weight, relative to the monomers employed, of one or more light stabilizer(s), and the group Q being the initiating moiety of a "living" group transfer polymerization initiator Q—Z and Z" being derived from an activating substituent Z of such an initiator, and the initiator Q—Z being capable of forming, with a monomer containing a C—C double bond, a "living" polymer chain which contains the group Z" at one end of the "living" polymer chain and the group Q at the other end, and the "living" polymer chain being capable of initiating the polymerization of a further monomer which can be the same as that used for preparing the "living" polymer chain, or which can be different from the latter, so that a larger "living" polymer chain is formed which carries a group Z" at one end and a group Q at the other end, Z" being the same as Z or an isomer thereof.

With particular advantage, Q is a group of the formula (E$^1$)$_3$M as defined above.

Z preferably is

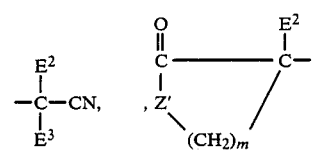

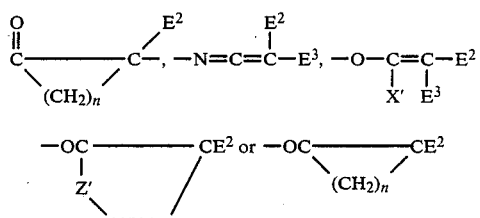

and mixtures thereof, in which X' is OSi(E$^1$)$_3$, —E, —OE or NE'E", with E, E$^1$, E' and E" being as defined above, E$^2$ and E$^3$ independently of one another are hydrogen, C$_1$–C$_{10}$alkyl, C$_2$–C$_{10}$alkenyl, C$_6$–C$_{10}$aryl, C$_1$–C$_6$alkyl-C$_6$–C$_{10}$aryl or C$_6$–C$_{10}$aryl-C$_1$–C$_4$alkyl, it being possible for the above groups (with the exception of hydrogen) to contain one or more functional substituents which do not react under the polymerization conditions, Z' is O or NE', m is 2, 3 or 4 and n is 3, 4 or 5.

The microparticles according to the invention are prepared, as already mentioned, with particular advantage by means of group transfer polymerization, at least one polymerization step being carried out in the presence of the light stabilizer(s) (addition of the latter to the monomers before the polymerization, during the polymerization or towards the end of the polymerization). Group transfer polymerization is known per se and can be carried out by the processes described in the literature. The group transfer polymerization processes described in WO-A-86/00,626 or US-A 4,695,607 and the processes known from the literature references cited therein are used with particular advantage. WO-A-86/00,626 and US-A 4,695,607 are to be understood as a part of the present description.

In particular, group transfer polymerization is here to be understood as a process in which the polymerization of monomers having C—C double bonds is initiated by various initiators of the formula Q—Z, in which Z is an activating substituent which is bound to one end of the growing polymer molecule, and Q is a group which continuously migrates to the other end of the growing polymer molecule, as more monomer is being added to the polymer molecule. Thus, for example, the polymerization of a monomer

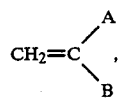

initiated by the initiator Q—Z, proceeds as follows:

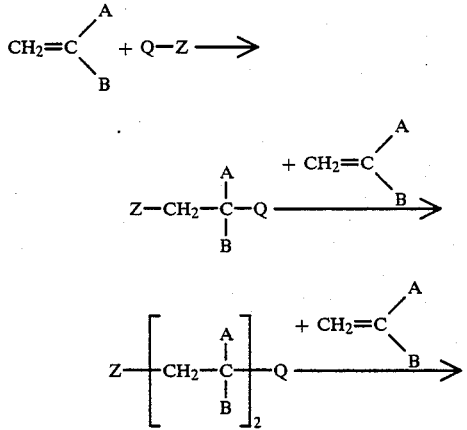

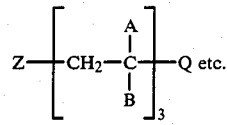

The group Q is thus an active centre and can initiate the addition of further monomers. A polymer molecular having a group Q is termed a "living" polymer and the group Q itself is termed a "living" group transfer polymerization centre.

In this connection, the word "living" is always put in quotation marks, since, of course, it has nothing to do with life in the biological sense. The expression is commonly used for such groups in the relevant literature.

Those group transfer polymerization methods are especially used for the preparation of the light-stabilized star polymer microparticles according to the invention which, in addition to WO-A-86/00,626, are partly also described in US-A 4,414,372, 4,417,034, 4,508,880 and 4,524,196, which are likewise to be regarded as part of the present description. Group transfer polymerizations give a "living" polymer when, for example, an initiator of the formula $(E^1)_3MZ$ is used for initiating the polymerization of a monomer having a C—C double bond.

In the initiator $(E^1)_3MZ$, the group Z is an activating substituent (as described above) which is bound to one end of the "living" polymer molecule. The group $(E^1)_3M$ adds to the other end, the "living" end, of the polymer molecule. The resulting "living" polymer molecule can itself function as an initiator for the polymerization of the same or another monomer to form a new "living" polymer molecule, with Z at one end and $(E^1)_3M$ at the other ("living") end. The "living" polymer can then be deactivated, if desired, for example by reaction with a proton source, for example an alcohol.

The light-stabilized star microparticles, which can be prepared by group transfer polymerization and are obtained by deactivation of the "living" polymer molecules (polymer particles) with a proton source, for example with alcohols, especially ethanol or methanol, are of central importance within the scope of the present invention. It is these which can, according to the invention, be incorporated in coating compositions. The "living" polymer molecules or polymer microparticles are to be understood as intermediate products or stages, which are normally not isolated.

For illustration, the reaction scheme of the polymerization of a specific monomer (methyl methacrylate) with a specific initiator (1-trimethylsiloxy-1-isobutoxy-2-methylpropene) is shown below:

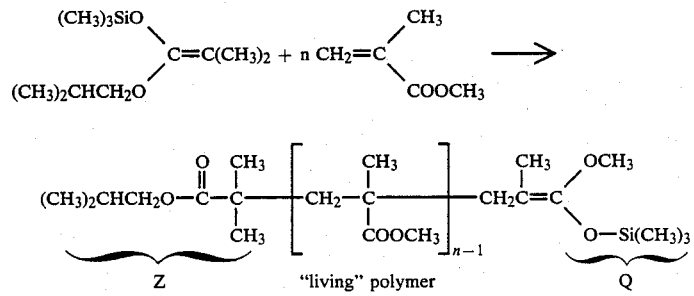

When this "living" polymer is reacted with a further monomer having a C—C double bond, the following "living" polymer is formed, for example, with m mol of butyl methacrylate:

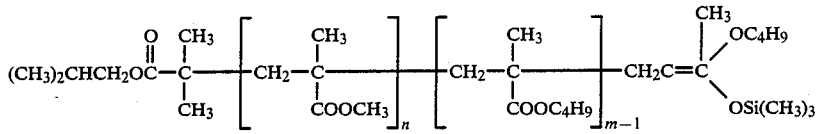

Contact with methanol gives the following deactivated polymer:

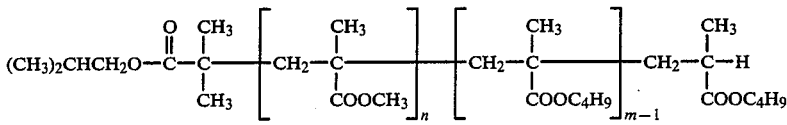

The polymer microparticles according to the invention can, for example, be built up according to three different methods which are described below:

1. Arm/core process

This comprises (a) preparing a "living" polymer by reacting a group transfer initiator with one or more monomers having a C—C double bond capable of group transfer polymerization and (b) reacting the resulting "living" polymer with a mixture which contains 1–100% by weight of a monomer having at least 2 C—C double bonds polymerizable by group transfer polymerization and 0–99% by weight of a monomer having one C—C double bond polymerizable by group transfer polymerization, step (a) or/and (b) being carried out in the presence of 0.1 to 30% by weight, relative to the monomers, of one or more light stabilizer(s).

In other words, for example, a "living" polymer (the arm) is prepared by reacting a monomer A containing a C—C double bond with a group transfer initiator $(E^1)_3MZ$. The resulting "living" polymer is reacted with a polyfunctional compound (monomer B) which contains at least 2 polymerizable C—C double bonds in the molecule. This gives a star polymer microparticle with arms of polymerized monomer A, which are polymerized onto a crosslinked core of polymerized monomer B. The active group transfer centres in the core can be deactivated by reaction with a proton source. The light stabilizer(s) can be added in both polymerization steps or in only one of them. Accordingly, polymer microparticles are formed which are light-stabilized in the core, in the arms or in both of these parts.

2. Core/arm process

This comprises (a) preparing a "living" core by reacting a group transfer initiator with a mixture containing 1–100% by weight of a monomer having at least 2 C—C double bonds polymerizable by group transfer polymerization and 0–99% by weight of a monomer having one C—C double bond polymerizable by group transfer polymerization, and (b) reacting the resulting "living" core with one or more monomers having a C—C double bond and polymerizable by group transfer polymerization, step (a) or/and (b) being carried out in the presence of 0.1 to 30% by weight, relative to the monomers, of one or more light stabilizer(s).

In other words, for example, a "living" core is prepared by reacting a group transfer initiator $(E^1)_3MZ$ with a polyfunctional compound (monomer B) containing at least 2 polymerizable C—C double bonds per molecule.

This "living" core is then reacted with a monomer A (as described above), whereby a star polymer microparticle having arms of polymerized monomer A, which are polymerized onto the crosslinked core of polymerized monomer B, is formed. The active group transfer centres at the ends of the arms can be reacted with further monomers or can be deactivated by reaction with a proton donor. The light stabilizer(s) can be added in both polymerization steps or in only one of them. Accordingly, polymer microparticles are formed which are light-stabilized in the core, in the arms or in both of these parts.

3. Arm/core/arm process

This comprises (a) preparing a "living" polymer by reacting a group transfer initiator with one or more monomers having a C—C double bond which is polymerizable by group transfer polymerization, (b) reacting the resulting "living" polymer with a mixture containing 1–100% by weight of a monomer having at least 2 C—C double bonds polymerizable by group transfer polymerization and 0–99% by weight of a monomer having one C—C double bond polymerizable by group transfer polymerization, in such a way that "living" star polymer microparticles with "living" group transfer polymerization centres in the core are obtained, and (c) reacting the resulting "living" polymers with one or more monomers which contain a C—C double bond and which are polymerizable by group transfer polymerization, these monomers being identical to or different from those employed in step (a), steps (a), (b) or/and (c) being carried out in the presence of 0.1 to 30% by weight, relative to the monomers, of one or more light stabilizer(s).

Thus, in this process, for example a "living" polymer (the first arms) are prepared by reacting a monomer A, which contains a polymerizable C—C double bond in the molecule, with a group transfer initiator $(E^1)_3MZ$. The resulting "living" polymer is then reacted with a polyfunctional compound (monomer B) which contains at least 2 polymerizable C—C double bonds in the molecule. The resulting polymer has arms of polymerized monomer A, which are polymerized onto a crosslinked core of polymerized monomer B, the core still containing "living" group transfer centres. This polymer is then reacted with a third monomer C containing a polymerizable C—C double bond, whereby further arms consisting of polymerized monomer C are polymerized onto the core. The nature and quantity (mole number)

of C can here be the same as those of A or different. Correspondingly, the two types of arms can have different molecular weights or/and be derived from different monomers. If 2 or more types of "living" group transfer centres are introduced into the core and functional groups of different reactivity are used in the arms, polymer microparticles with more than 2 different types of arms are obtained. The light stabilizer(s) can be added in the 3 polymerization steps, in only one of them or in any two of them. Accordingly, polymer microparticles are formed which are light-stabilized in the core, in one type of arm, in all types of arms, in the core and one type of arm or in the core and all types of arms.

The polyfunctional compounds used (monomers with at least 2 C—C double bonds polymerizable by group transfer polymerization), also termed "monomers B" above, can be any molecules containing at least 2 ethylenic C—C double bonds. Examples of these are: ethylene dimethacrylate, 1,3-butylene dimethacrylate, ethylene glycol dimethacrylate, tetraethylene glycol dimethacrylate, di- and tri-ethylene glycol dimethacrylate, trimethylolpropane trimethacrylate, 1,6-hexylene dimethacrylate, 1,4-butylene dimethacrylate, ethylene diacrylate, 1,3-butylene diacrylate, tetraethylene glycol diacrylate, triethylene glycol diacrylate, trimethylolpropane triacrylate, 1,6-hexylene diacrylate, 1,4-butylene diacrylate and allyl methacrylate.

Examples of monomers having one double bond polymerizable by group transfer polymerization are substituted or unsubstituted alkyl esters of methacrylic acid, such as methyl, ethyl, butyl, hexyl and 2-ethylhexyl methacrylate and 2-isocyanoethyl methacrylate. Methyl, ethyl and 2-ethylhexyl methacrylate are preferred.

Further examples of usable monomers and procedures can be taken from US-A 4,417,034, already mentioned above, especially from columns 2–9.

Further examples of starting monomers which can be used according to the invention, of catalysts, solvents, initiators, reaction schemes and calculation methods can be taken from pages 17 to 24 of WO-A-86/00,626 or column 11, line 40 to column 16, line 46 of US-A 4,695,607, and are to be understood as disclosed in the present description.

The following are particular examples of initiators: 1-trimethylsiloxy-1-isobutoxy-2-methylpropene and 1-(2-trimethylsiloxyethoxy)-1-trimethylsiloxy-2-methylpropene.

Examples of catalysts are tris-(dimethylamino)-sulphonium bifluoride ($TASHF_2$), tetrabutylammonium bifluoride ($TBAHF_2$), tetrabutylammonium fluoride (TBAF) and tetrabutylammonium chlorobenzoate (TBACF).

Examples of solvents which can be used are 1,2-dimethoxyethane, acetonitrile, xylene and tetrahydrofuran.

The light stabilizers which are contained in the star polymer microparticles according to the invention and which, as described above, are present during the polymerization in at least one polymerization step during the preparation of the microparticles, can be chemically anchored in the polymer (the light stabilizer participates in the polymerization) or only be physically occluded. Both cases give the desired light stabilization, but chemical incorporation is preferred.

Representatives of virtually all known classes of light stabilizers, for example sterically hindered amines, 2-(2-hydroxyphenyl)-benzotriazoles, oxalic acid anilides, 2-hydroxybenzophenones, hydroxyphenyltriazines or cinnamic acid derivatives, can be used for the light stabilization of the microparticles. The preferred light stabilizers here are 2-(2-hydroxyphenyl)-benzotriazoles and especially sterically hindered amines.

If the light stabilizer belongs to the class of sterically hindered amines, these are preferably cyclic amines, in particular derivatives of 5-membered, 6-membered or 7-membered heterocyclic ring systems with 1 or 2 N atoms, which have tertiary C atoms in both the ortho-positions to the N atom, thus effecting steric hindrance of the N atom.

Examples of such ring systems are 2,2,5,5-tetrasubstituted pyrrolidines, imidazolidones or oxazolines of the formulae

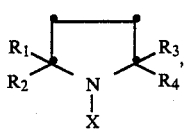

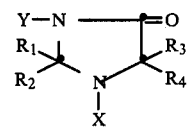

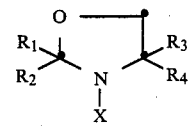

or 2,2,6,6-tetrasubstituted piperazinones and piperazinediones of the formulae

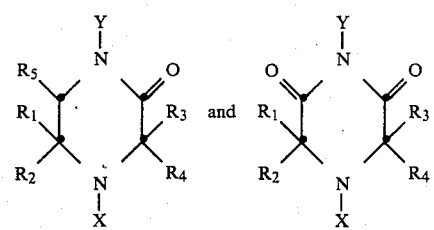

or diazacycloheptanones of the formula

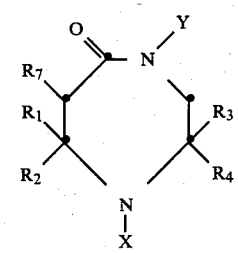

in which $R_1$, $R_2$, $R_3$ and $R_4$ are aliphatic hydrocarbon radicals which may be combined to form spiro rings, $R_5$ and $R_7$ are hydrogen or alkyl and X is hydrogen, oxyl oxygen or a monovalent organic radical and Y is hydrogen or a monovalent or divalent organic radical, for example a compound of the formula

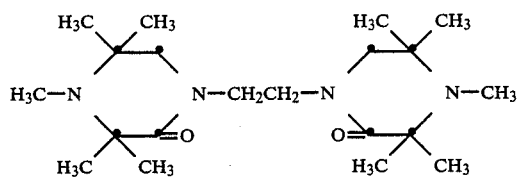

Decahydroquinolines disubstituted in the 2-position are also representatives of sterically hindered amines.

Amongst the sterically hindered amine compounds, 2,2,6,6-tetraalkylpiperidine derivatives are of particular importance. These are compounds which contain in their molecule at least one group of the formula I

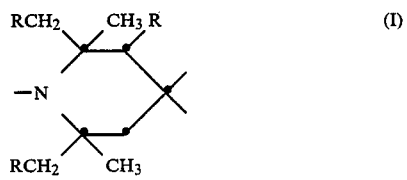

in which R is hydrogen or methyl. The light stabilizer can contain one or more such groups of the formula I, for example it can be a mono-, bis-, tris-, tetra- or oligo-piperidine compound. Those piperidine derivatives are preferred which contain one or more groups of the formula I, in which R is hydrogen, and those in which the ring nitrogen does not carry a hydrogen atom.

Most of these piperidine light stabilizers carry polar substituents in the 4-position of the piperidine ring or carry a spiro ring in this position.

The following classes of piperidine compounds are of particular importance.

(a) Compounds of the formula II

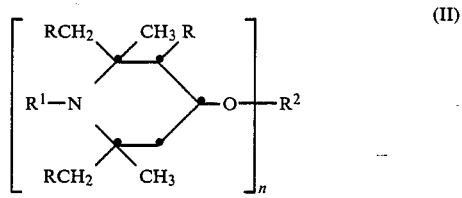

in which n is a number from 1 to 4, preferably 1 or 2, R is hydrogen or methyl, $R^1$ is hydrogen, oxyl, $C_1$–$C_{18}$alkyl, $C_3$–$C_8$alkenyl, $C_3$–$C_8$alkynyl, $C_1$–$C_{18}$alkoxy, $C_5$–$C_{12}$cycloalkoxy, $C_3$–$C_{18}$alkenyloxy, $C_7$–$C_{12}$aralkyl, $C_2$–$C_8$alkanoyl, $C_3$–$C_5$alkenoyl, $C_2$–$C_8$alkanoyloxy-$C_1$–$C_4$alkyl, $C_3$–$C_8$alkenoyloxy-$C_1$–$C_4$alkyl or glycidyl, $R^1$ preferably being $C_1$–$C_{12}$alkyl, allyl, benzyl, acetyl, (meth)acryloyl or (meth)acryloyloxyethyl, and $R^2$, if n=1, is $C_1$–$C_{18}$alkyl which may be interrupted by one or more oxygen atoms, cyanoethyl, benzyl, glycidyl, a monobasic radical of an aliphatic, cycloaliphatic, araliphatic, unsaturated or aromatic carboxylic acid, carbamic acid or phosphorus-containing acid or a monovalent silyl radical, preferably a radical of an aliphatic (saturated or preferably unsaturated) carboxylic acid having 2 to 18 C atoms, a cycloaliphatic carboxylic acid having 7 to 15 C atoms, an α,β-unsaturated carboxylic acid having 3 to 5 C atoms or an aromatic carboxylic acid having 7 to 15 atoms, or, if n=2, $R^2$ is $C_1$–$C_{12}$alkylene, $C_4$–$C_{12}$alkenylene, xylylene, a dibasic radical of an aliphatic, cycloaliphatic, araliphatic or aromatic dicarboxylic acid, dicarbamic acid or phosphorus-containing acid or a divalent silyl radical, preferably a radical of an aliphatic dicarboxylic acid having 2 to 36 C atoms, a cycloaliphatic or aromatic dicarboxylic acid having 8–14 C atoms or aliphatic, cycloaliphatic or aromatic di-carbamic acid having 8–14 C atoms, or, if n=3, $R^2$ is a tribasic radical of a (saturated or preferably unsaturated) aliphatic, cycloaliphatic or aromatic tricarboxylic acid, an aromatic tricarbamic acid or a phosphorus-containing acid or a trivalent silyl radical, or, if n=4, $R^2$ is a tetrabasic radical of an aliphatic, cycloaliphatic or aromatic tetracarboxylic acid.

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

$C_1$–$C_{18}$Alkyl radicals $R^1$ or $R^2$ can be, for example, the groups listed above and in addition also, for example, n-tridecyl, n-tetradecyl, n-hexadecyl or n-octadecyl. Examples of $C_1$–$C_{18}$alkoxy are the alkoxy groups derived from the above alkyl groups.

A $C_3$–$C_8$-alkenoyloxy-$C_1$–$C_4$alkyl radical $R^1$ is, for example, $C_3$–$C_5$alkenoyl-oxy-$C_1$–$C_2$alkyl, especially (meth)acryloyloxyethyl.

A $C_3$–$C_8$alkenyl radical $R^1$ can be, for example, 1-propenyl, allyl, methallyl, 2-butenyl, 2-pentenyl, 2-hexenyl, 2-octenyl or 4-tert-butyl-2-butenyl.

A $C_3$–$C_8$alkynyl radical $R^1$ is preferably propargyl. Cycloalkyl(oxy) is preferably $C_5$–$C_7$cycloalkyl(oxy), especially cyclohexyl(oxy).

A $C_7$–$C_{12}$aralkyl radical $R^1$ is in particular phenethyl or especially benzyl.

A $C_1$–$C_8$alkanoyl radical $R^1$ is, for example, formyl, propionyl, butyryl, octanoyl or preferably acetyl, and $C_3$–$C_5$alkenoyl is especially acryloyl.

A monobasic radical $R^2$ of a carboxylic acid is, for example, an acetic acid, caproic acid, stearic acid, acrylic acid, methacrylic acid or benzoic acid radical.

A dibasic radical $R^2$ of a dicarboxylic acid is, for example, a malonic acid, adipic acid, suberic acid, sebacic acid, maleic acid, fumaric acid, phthalic acid, dibutylmalonic acid, dibenzylmalonic acid, or bicycloheptenedicarboxylic acid radical.

A tribasic radical $R^2$ of a tricarboxylic acid is, for example, a trimellitic acid or nitrilotriacetic acid radical.

A tetrabasic radical $R^2$ of a tetracarboxylic acid is, for example, the tetrabasic radical of butane-1,2,3,4-tetracarboxylic acid or pyromellitic acid.

A dibasic radical $R^2$ of a dicarbamic acid is, for example, a hexamethylenedicarbamic acid or 2,4-toluylenedicarbamic acid radical.

Those compounds of the formula II should be especially mentioned in which n is 1 or 2, R is hydrogen, $R^1$ is oxyl, $C_1$–$C_6$alkyl, $C_1$–$C_{12}$alkoxy, $C_3$–$C_8$alkenoyloxy, cyclohexyloxy, $C_3$–$C_8$alkenyl, for example allyl, benzyl, $C_2$–$C_6$alkanoyl, $C_3$–$C_5$alkenoyl, for example acryloyl or methacryloyl, $C_3$–$C_8$alkenoyloxy-$C_1$–$C_4$alkyl, for example (meth)acryloyloxyethyl, or glycidyl and $R_2$, if n=1, is $C_1$–$C_{12}$alkyl, benzyl or the radical of an aliphatic carboxylic acid having 2–18 C atoms, of an α,β-unsaturated carboxylic acid having 3–5 C atoms or of an aromatic carboxylic acid having 7–15 C atoms, and, if n=2, $R^2$ is $C_1$–$C_6$alkylene, $C_4$–$C_8$alkenylene or the radical of an aliphatic saturated or preferably unsaturated dicarboxylic acid having 2–18 C atoms.

Those compounds of the formula II are particularly preferred in which $R^1$ or/and $R^2$ contain(s) at least one ethylenic double bond, for example those in which $R^1$ is $C_3$–$C_8$alkenyl, $C_3$–$C_5$alkenoyl, $C_3$–$C_8$alkenyloxy or $C_3$–$C_8$alkenoyloxy-$C_1$–$C_4$alkyl, and $R^2$ is as defined and preferred above, and also those, for example, in which $R^2$ (if n=1) is a monobasic radical of an unsaturated carboxylic acid (for example having 3–5 C atoms, α,β-unsaturated, especially (meth)acryloyl) or (if n=2) $C_4$–$C_{12}$-alkenylene or the radical of an unsaturated dicarboxylic acid (for example of maleic acid or fumaric acid) and $R^1$ is as defined and preferred under the formula II, and those in which both $R^1$ and $R^2$ each are such ethylenically unsaturated radicals. The last mentioned compounds are employed especially if the light stabilizer is to be polymerized into the core, since such a di-unsaturated piperidine derivative can then also serve as a crosslinking agent.

Examples of tetraalkylpiperidine compounds of the formula II are the following:

(1) 4-stearoyloxy-1,2,2,6,6-pentamethylpiperidine, (2) 4-methacryloyloxy-1,2,2,6,6-pentamethylpiperidine, (3) di-(1-benzyl-2,2,6,6-tetramethylpiperid-4-yl) maleate, (4) di-(1,2,2,6,6-pentamethylpiperid-4-yl) adipate, (5) di-(1,2,2,6,6-pentamethylpiperid-4-yl) sebacate, (6) di-(1,2,3,6-tetramethyl-2,6-diethyl-piperid-4-yl) sebacate, (7) di-(1-allyl-2,2,6,6-tetramethylpiperid-4-yl) phthalate, (8) 1-propargyl-4-β-cyanoethoxy-2,2,6,6-tetramethylpiperidine, (9) 1-acetyl-2,2,6,6-tetramethylpiperid-4-yl acetate, (10) tri-(1,2,2,6,6-pentamethylpiperid-4-yl) trimellitate, (11) 1-acryloyl-4-benzyloxy-2,2,6,6-tetramethylpiperidine, (12) di-(1,2,2,6,6-pentamethylpiperid-4-yl) dibutylmalonate, (12a) 1-benzyl-2,2,6,6-tetramethyl-4-tetramethyl-4-(meth)acryloyloxypiperidine, (12b) 1,2,2,6,6-pentamethyl-4-vinyloxypiperidine, (12c) 1-(meth)acryloyl-4-(meth)acryloyloxy-2,2,6,6-tetramethylpiperidine, (12d) 4-crotonoyloxy-2,2,6,6-tetramethylpiperidine, (12e) 1-crotonoyl-4-crotonoyloxy-2,2,6,6-tetramethylpiperidine, (13) di-(1,2,2,6,6-pentamethylpiperid-4-yl) dibenzylmalonate, (14) di-(1,2,3,6-tetramethyl-2,6-diethylpiperid-4-yl) dibenzylmalonate, (15) hexane-1',6'-bis-(4-carbamoyloxy-1-n-butyl-2,2,6,6-tetramethylpiperidine), (16) toluene-2',4'-bis-(4-carbamoyloxy-1-n-propyl-2,2,6,6-tetramethylpiperidine), (17) dimethyl-bis-(2,2,6,6-tetramethylpiperid-4-yloxy)-silane, (18) phenyl-tris-(2,2,6,6-tetramethylpiperid-4-yloxy)-silane, (19) tris-(1-propyl-2,2,6,6-tetramethylpiperid-4-yl) phosphite, (20) tris-(1-propyl-2,2,6,6-tetramethylpiperid-4-yl) phosphate, (21) bis-(1,2,2,6,6-pentamethylpiperid-4-yl) phenylphosphonate, (22) di-(1,2,2,6,6-pentamethylpiperid-4yl) sebacate, (23) 4-acryloyloxy-1,2,2,6,6-pentamethylpiperidine, (24) 4-(meth)acryloyloxy-1-[2-((meth)acryloyloxy)ethyl]-2,2,6,6-tetramethylpiperidine and (26) 1-acetyl-2,2,6,6-tetramethyl-4-(meth)acryloyloxy-piperidine.

(b) Compounds of the formula (III)

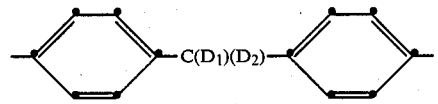

in which n is the number 1 or 2, R and $R^1$ are as defined and preferred under (a), $R^3$ is hydrogen, $C_1$–$C_{12}$alkyl, $C_5$–$C_7$-cycloalkyl, $C_7$–$C_8$aralkyl, $C_2$–$C_{18}$alkanoyl, $C_3$–$C_5$alkenoyl or benzoyl and $R^4$, if n=1, is $C_1$–$C_{18}$alkyl, $C_3$–$C_8$alkenyl, $C_5$–$C_7$cycloalkyl, $C_1$–$C_4$alkyl substituted by a cyano, alkoxycarbonyl or carbamide group, glycidyl or a group of the formula —CONH—Z with Z being hydrogen, methyl or phenyl, or, if n=2, $R^4$ is $C_2$–$C_{12}$alkylene, $C_6$–$C_{12}$arylene, xylylene or, with the proviso that $R^3$ is not alkanoyl, alkenoyl or benzoyl, $R^4$ can also be a dibasic radical of a (saturated or unsaturated) aliphatic, cycloaliphatic or aromatic dicarboxylic acid or dicarbamic acid or a —CO— group, or $R^3$ and $R^4$ together, if n=1, can be the dibasic radical of a (saturated or unsaturated) aliphatic, cycloaliphatic or aromatic 1,2- or 1,3-dicarboxylic acid.

Any $C_1$–$C_{12}$alkyl or $C_1$–$C_{18}$alkyl substituents are as already defined under (a).

Any $C_5$–$C_7$cycloalkyl substituents are especially cyclohexyl.

A $C_7$–$C_8$aralkyl radical $R^3$ is in particular phenylethyl or especially benzyl.

A $C_2$–$C_{18}$alkanoyl radical $R^3$ is, for example, propionyl, butyryl, octanoyl, dodecanoyl, hexadecanoyl or octadecanoyl, and preferably acetyl, and $C_3$–$C_5$alkenoyl is especially acryloyl.

A $C_2$–$C_8$alkenyl radical $R^4$ is, for example, allyl, methallyl, 2-butenyl, 2-pentenyl, 2-hexenyl or 2-octenyl.

A $C_1$–$C_4$alkyl radical $R^4$ which is substituted by a cyano, alkoxycarbonyl or carbamide group can be, for example, 2-cyanoethyl, methoxycarbonylmethyl, 2-ethoxycarbonylethyl or 2-(dimethylaminocarbonyl)-ethyl.

Any $C_2$–$C_{12}$alkylene substituents are, for example, ethylene, propylene, 2,2-dimethylpropylene, tetramethylene, hexamethylene, octamethylene, decamethylene or dodecamethylene.

Any $C_6$–$C_{15}$arylene substituents are, for example, o-, m- or p-phenylene, 1,4-naphthylene, 4,4'-diphenylene or

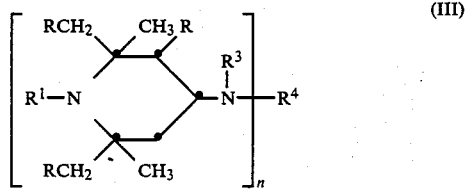

in which $D_1$ and $D_2$ independently of one another are hydrogen or methyl.

A $C_6$–$C_{12}$cycloalkylene radical D is especially cyclohexylene.

Those compounds of the formula III should especially be mentioned in which R and $R^1$ are as defined and preferred under (a), $R^3$ is hydrogen or $C_1$–$C_6$alkyl and $R^4$, if n=1, is $C_1$–$C_{12}$alkyl, $C_3$–$C_8$alkenyl, $C_1$–$C_4$alkyl which is substituted by cyano or carbamido, or CONH—Z and, if n=2, $R^4$ is as defined under the formula III, with the exception of $R^3+R^4$ combined.

Regarding the substituents having ethylenic double bonds, the same preferences as for the compounds of the formula II apply analogously to the compounds of the formula III. Those compounds are here especially preferred in which $R^3$ is hydrogen or $C_1$–$C_6$alkyl, $R^1$ is as defined and preferred under the formula II and $R^4$ is as defined and preferred for $R^2$ in the formula II.

Examples of tetraalkylpiperidine compounds of the formula III are the following: (27) N,N'-bis-(2,2,6,6-tetramethylpiperid-4-yl)-hexamethylene-1,6-diamine, (28) N,N'-bis-(2,2,6,6-tetramethylpiperid-4-yl)-hexamethylene-1,6-diacetamide, (29) 1-acetyl-4-(N-cyclohexylacetamido)-2,2,6,6-tetramethylpiperidine, (30) 4-benzoylamino-2,2,6,6-tetramethyl piperidine, (31) N,N'-bis-(2,2,6,6-tetramethylpiperid-4-yl)-N,N'-dibutyladipamide, (32) 1,2,2,6,6-pentamethyl-4-maleimido-piperidine, (32a) 1-acetyl-2,2,6,6-tetramethyl-4-maleimidopiperidine, (33) N,N'-bis-(2,2,6,6-tetramethylpiperid-4-yl)-p-xylylenediamine, (33a) 1-(meth)acryloyl-4-(meth)acrylamido-2,2,6,6-tetramethylpiperidine, (33b) 4-crotonamido-2,2,6,6-tetramethylpiperidine, (33c) 1-crotonoyl-4-crotonamido-2,2,6,6-tetramethylpiperidine, (34) 4-methacrylamido-1,2,2,6,6-pentamethylpiperidine, (35) 4-acrylamido-1,2,2,6,6-pentamethylpiperidine, (36) 4-N-n-butyl)-acrylamido-1,2,2,6,6-pentamethylpiperidine and (37) 4-(N-n-butyl)methacrylamido-1,2,2,6,6-pentamethylpiperidine.

(c) Compounds of the formula (IV)

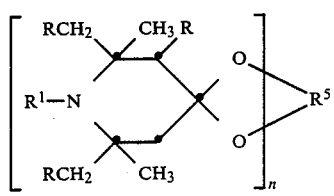
(IV)

in which n is the number 1 or 2, R and $R^1$ are as defined and preferred under (a) and $R^5$, if n=1, is $C_2$-$C_8$alkylene or $C_4$-$C_{22}$acyloxyalkylene and, if n=2, is the group $(-CH_2)_2C(CH_2-)_2$.

A $C_2$-$C_8$alkylene radical $R^5$ is, for example, ethylene, 1-methylethylene, propylene or 2-ethylpropylene.

A $C_4$-$C_{22}$acyloxyalkylene radical $R^5$ is, for example, 2-ethyl-2-acetoxymethylpropylene.

Thus, in the case of n=2, $R^5$ is the complement to form a spiro-6-ring and, in the case of n=1, preferably is the complement to form a spiro-5-or -6-ring.

The preferences for the substituent $R^1$ are here the same as in formula II (substituent with ethylenic double bonds).

Examples of tetraalkylpiperidine compounds from this class are the following compounds: (38) 9-aza-8,8,10,10-tetramethyl-1,5-dioxaspiro[5.5]undecane, (39) 9-aza-8,8,10,10-tetramethyl-3-ethyl-1,5-dioxaspiro[5.5]undecane, (40) 8-aza-2,7,7,8,9,9-hexamethyl-1,4-dioxaspiro[4.5]decane, (41) 9-aza-3-ethyl-3-acetoxymethyl-9-acetyl-8,8,10,10-tetramethyl-1,5-dioxaspiro[5.5]undecane and (42) 2,2,6,6-tetramethylpiperidine-4-spiro-2'-(1',3'-dioxane)-5'-spiro-5''-(1'',3''-dioxane)-2''-spiro-4'''-(2''',2''',6''',6'''-tetramethylpiperidine) and those compounds which are substituted in the 1-position by the ethylenically unsaturated radicals defined under the formula II.

(d) Compounds of the formulae VA, VB and VC

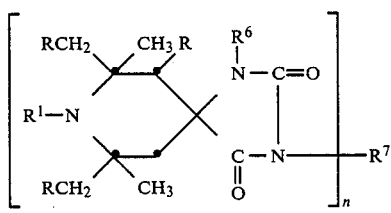
(VA)

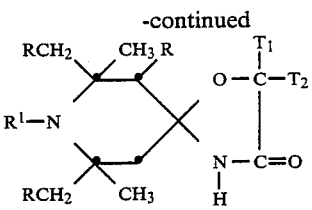
(VB)

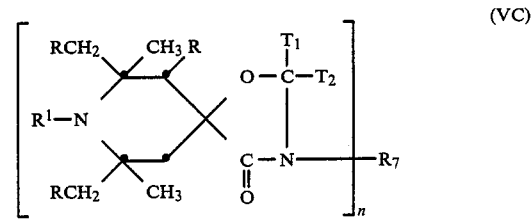
(VC)

in which n is the number 1 or 2, R and $R^1$ are as defined and preferred under (a), $R^6$ is hydrogen, $C_1$-$C_{12}$alkyl, allyl, benzyl, glycidyl or $C_2$-$C_6$alkoxyalkyl and $R^7$, if n=1, is hydrogen, $C_1$-$C_{12}$alkyl, $C_3$-$C_5$alkenyl, $C_7$-$C_9$aralkyl, $C_5$-$C_7$cycloalkyl, $C_2$-$C_6$alkoxyalkyl, $C_6$-$C_{10}$aryl, glycidyl or a group of the formula $-(CH_2)_p-COO-Q$ or of the formula $-(CH_2)_p-O-CO-Q$, with p being 1 or 2 and Q being $C_1$-$C_4$alkyl or phenyl, or, if n=2, $R^7$ is $C_2$-$C_{12}$alkylene, $C_4$-$C_{12}$alkenylene, $C_6$-$C_{12}$arylene, or a group $-CH_2CH(OZ')CH_2-(OCH_2-CH(OZ')CH_2)_2-$, with $Z'$ being $C_1$-$C_{18}$alkyl, $C_3$-$C_8$alkenyl, benzyl, $C_2$-$C_{12}$alkanoyl, $C_3$-$C_8$-alkenoyl or benzoyl, and $T_1$ and $T_2$ independently of one another are hydrogen, $C_1$-$C_{18}$alkyl or are $C_6$-$C_{10}$aryl or $C_7$-$C_9$aralkyl which are unsubstituted or substituted by halogen or $C_1$-$C_4$alkyl, or $T_1$ and $T_2$, together with the C atom linking them, form a $C_5$-$C_{12}$cycloalkane ring.

Any $C_1$-$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$-$C_{18}$alkyl substituents can, for example, be the groups listed above and additionally also, for example, n-tridecyl, n-tetradecyl, n-hexadecyl or n-octadecyl.

Any $C_2$-$C_6$alkoxyalkyl substituents are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

A $C_3$-$C_5$alkenyl radical $R^7$ is, for example, 1-propenyl, allyl, methallyl, 2-butenyl or 2-pentenyl.

$C_7$-$C_9$Aralkyl radicals $R^7$, $T_1$ and $T_2$ are in particular phenethyl or especially benzyl. $T_1$ and $T_2$ forming a cycloalkane ring together with the C atom can be, for example, a cyclopentane, cyclohexane, cyclooctane or cyclododecane ring.

$C_6$-$C_{10}$Aryl radicals $R^7$, $T_1$ and $T_2$ are in particular phenyl, $\alpha$- or $\beta$-naphthyl which are unsubstituted or substituted by halogen or $C_1$-$C_4$alkyl.

A $C_2$-$C_{12}$alkylene radical $R^7$ is, for example, ethylene, propylene, 2,2-dimethylpropylene, tetramethylene, hexamethylene, octamethylene, decamethylene or dodecamethylene.

A $C_4$-$C_{12}$alkenylene radical $R^7$ is in particular 2-butenylene, 2-pentenylene or 3-hexenylene.

A $C_6$-$C_{12}$arylene radical $R^7$ is, for example, o-, m- or p-phenylene, 1,4-naphthylene or 4,4'-diphenylene.

A $C_2-C_{12}$alkanoyl or $C_3-C_8$alkenoyl radical $Z'$ is, for example, propionyl, butyryl, octanoyl or dodecanoyl, and preferably acetyl, acryloyl or methacryloyl.

Again, those of the compounds of the formulae VA, VB and VC are preferably used in which at least one of the substituents contains an ethylenic double bond. See also the preferred definitions of $R^1$ in the formula II.

Examples of tetraalkylpiperidine compounds from this class are the following compounds: (43) 3-benzyl-1,3,8-triaza-7,7,9,9-tetramethylspiro[4.5]decane-2,4-dione, (44) 3-n-octyl-1,3,8-triaza-7,7,9,9-tetramethylspiro[4.5]decane-2,4-dione, (45) 3-allyl-1,3,8-triaza-1,7,7,9,9-pentamethylspiro[4.5]decane-2,4-dione, (46) 3-glycidyl-1,3,8-triaza-7,7,8,9,9-pentamethylspiro[4.5]-decane-2,4-dione, (47) 2-isopropyl-7,7,9,9-tetramethyl-1-oxa-3,8-diaza-4-oxo-spiro[4.5]decane, (48) 2,2-dibutyl-7,7,9,9-tetramethyl-1-oxa-3,8-diaza-4-oxo-spiro[4.5]decane, (49) 2,2,4,4-tetramethyl-7-oxa-3,20-diaza-21-oxo-dispiro[5.1.11.2]heneicosane, (50) 2-butyl-7,7,9,9-tetramethyl-1-oxa-4,8-diaza-3-oxo-spiro[4.5]decane, (51) 8-acetyl-3-dodecyl-1,3,8-triaza-7,7,9,9-tetramethyl-spiro[4.5]decane-2,4-dione and (51a) 1,3,8-triaza-2,4-dioxo-3-acryloyloxyethyl-7,7,8,9,9-pentamethyl-spiro[4.5]decane, or the compounds of the following formulae:

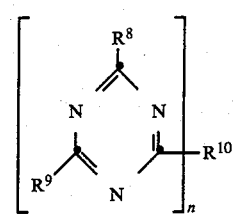
(VI)

in which n is the number 1 or 2 and $R^8$ is a group of the formula

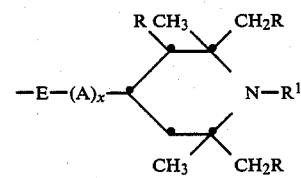

in which R and $R^1$ are as defined and preferred under (a), E is —O— or —NR$^{11}$—, A is $C_2-C_6$alkylene or —(CH$_2$)$_3$—O— and x is one of the numbers 0 or 1, $R^9$ is

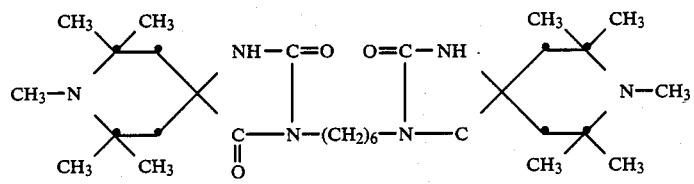
(52)

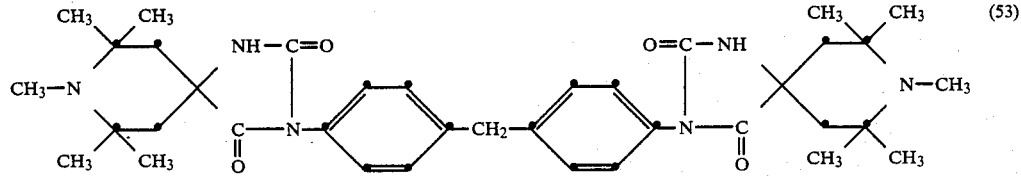
(53)

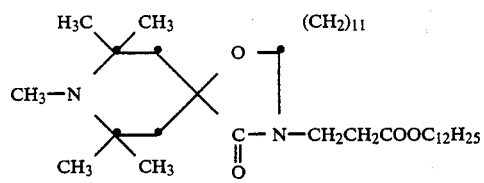
(54)

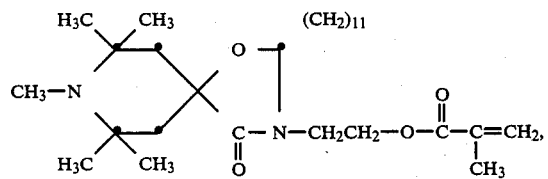
(55)

and the above compounds which, in place of the alkyl substituent on the piperidine nitrogen, contain one of the ethylenically unsaturated substituents (R') specifically defined in conjunction with the formula II.

(e) Compounds of the formula VI identical to $R^8$ or one of the groups —NR$^{11}$R$^{12}$, —OR$^{13}$, —NHCH$_2$OR$^{13}$ or —N(CH$_2$OR$^{13}$)$_2$, $R^{10}$ is, if n=1, identical to $R^8$ or $R^9$ and, if n=2, is a group —E—B—E—, wherein B is $C_2-C_6$alkylene which may be interrupted by —N(R$^{11}$)—, $R^{11}$ is $C_1-C_{12}$alkyl, cyclohexyl, benzyl or a group of the formula

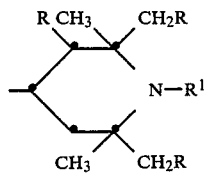

$R^{12}$ is $C_1$–$C_{12}$alkyl, cyclohexyl or benzyl and $R^{13}$ is $C_1$–$C_{12}$alkyl or phenyl or $R^{11}$ and $R^{12}$ together are $C_4$–$C_5$alkylene or $C_4$–$C_5$oxaalkylene, for example

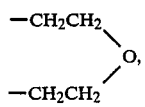

or a group of the formula

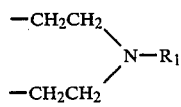

or $R^{11}$ and $R^{12}$ can also each be a group of the formula

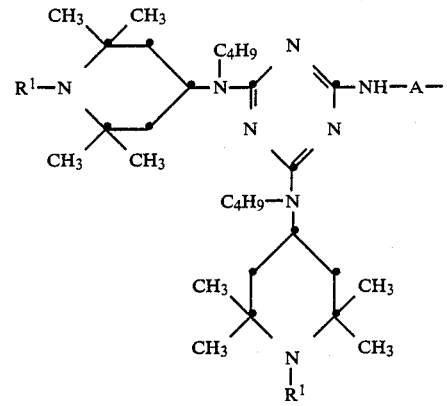

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

A $C_2$–$C_6$alkylene radical A is, for example, ethylene, propylene, 2,2-dimethylpropylene, tetramethylene or hexamethylene.

If $R^{11}$ and $R^{12}$ together are $C_4$–$C_5$alkylene or oxaalkylene, they are, for example, tetramethylene, pentamethylene or 3-oxapentamethylene.

Again, those compounds of the formula VI are preferred which contain substituents with ethylenic double bonds. See the analogous preferred definitions under the formula II.

Examples of tetraalkylpiperidine compounds from this class are the compounds of the following formulae:

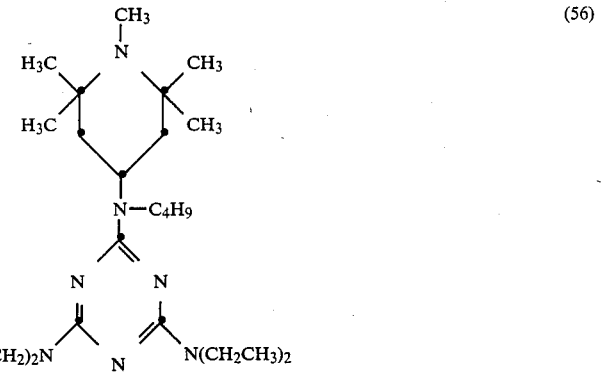

(56)

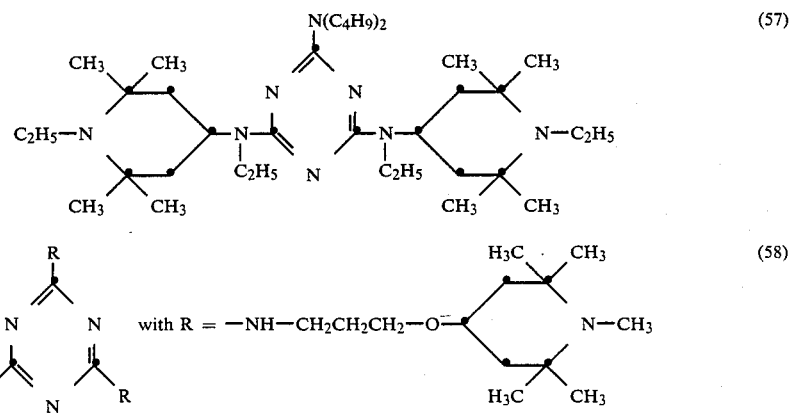

(57)

(58) with R = —NH—CH$_2$CH$_2$CH$_2$—O—

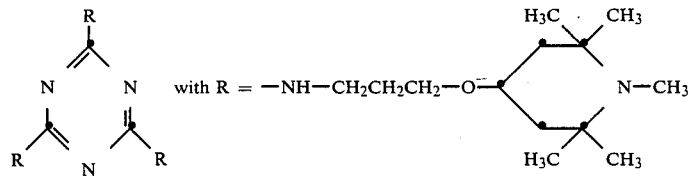

and
(59)
with
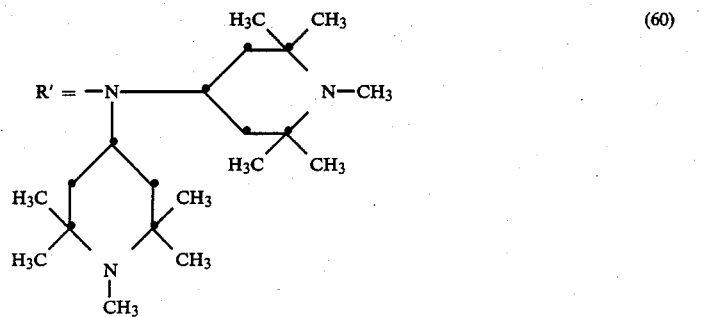
(60)
and
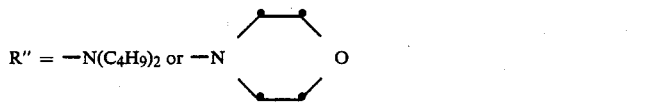
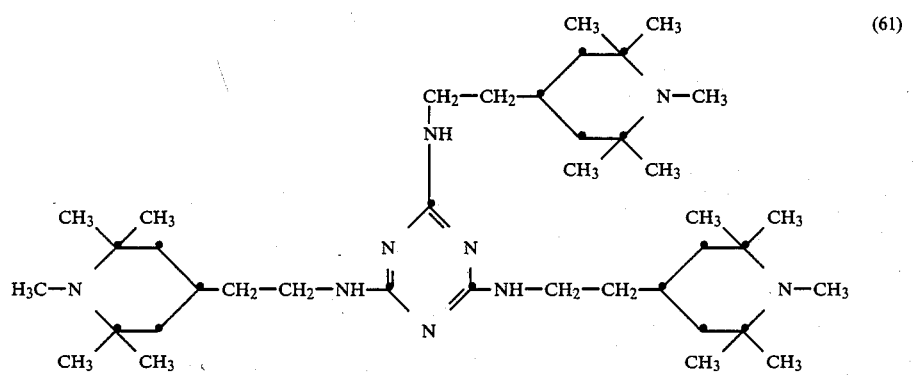
(61)
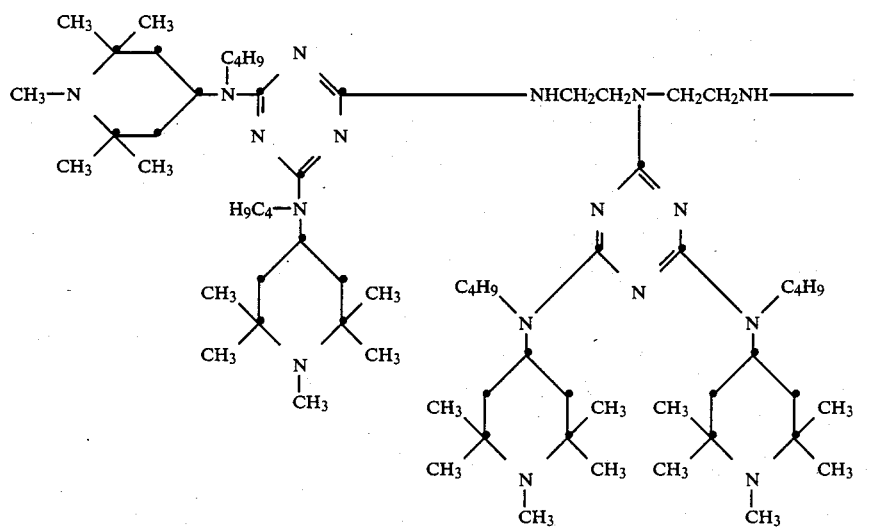
(62)

-continued

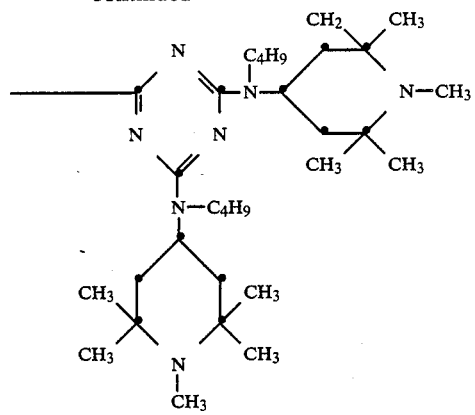
(63)

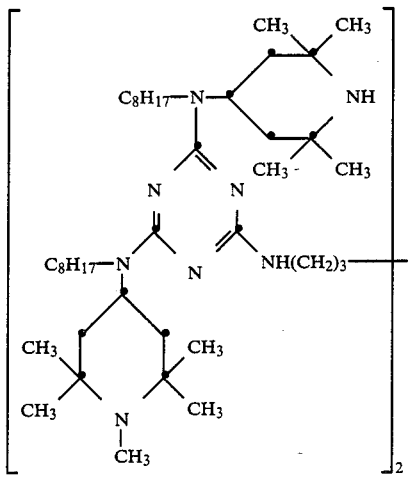
(64)

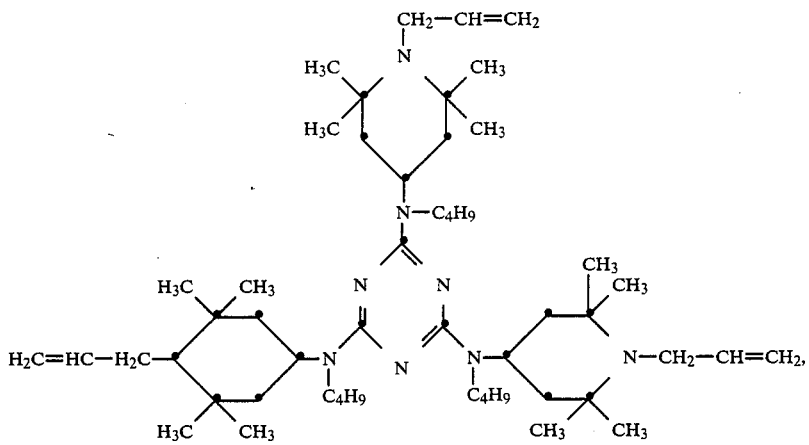

and compounds 56–63 which, in place of the methyl group on the piperidine nitrogen, carry an ethylenically unsaturated substituent as specifically defined for R' under the formula II.

(f) Oligomeric or polymeric compounds, the recurrent structural unit of which contains a 2,2,6,6-tetraalkylpiperidine radical of the formula (I), in particular polyesters, polyethers, polyamides, polyamines, polyurethanes, polyureas, polyaminotriazines, poly(meth)acrylates, poly(meth)acrylamides and copolymers thereof, which contain such radicals.

Examples of 2,2,6,6-tetraalkylpiperidine light stabilizers from this class are the compounds of the following formulae, m being a number from 2 to 200.

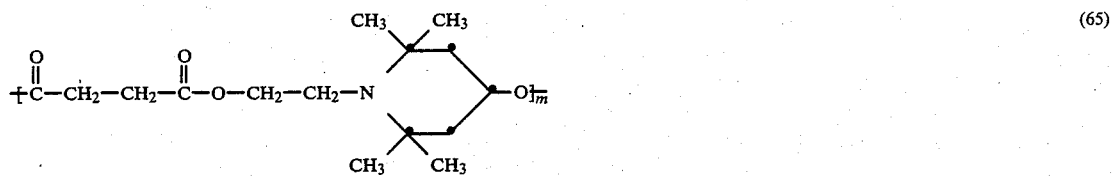
(65)
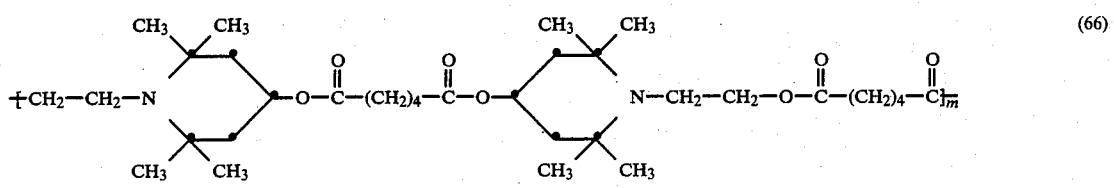
(66)
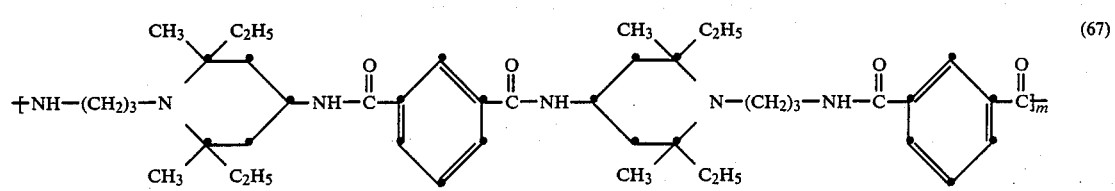
(67)
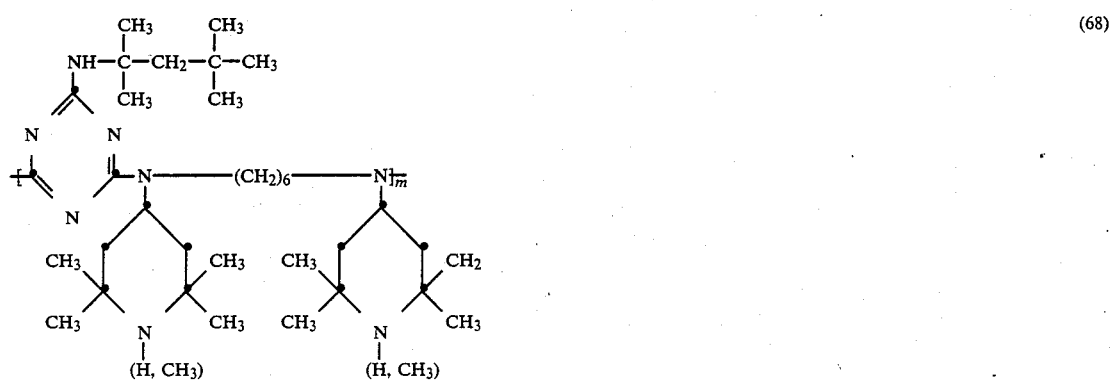
(68)
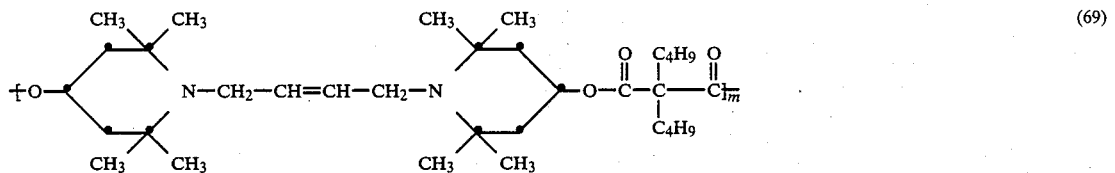
(69)
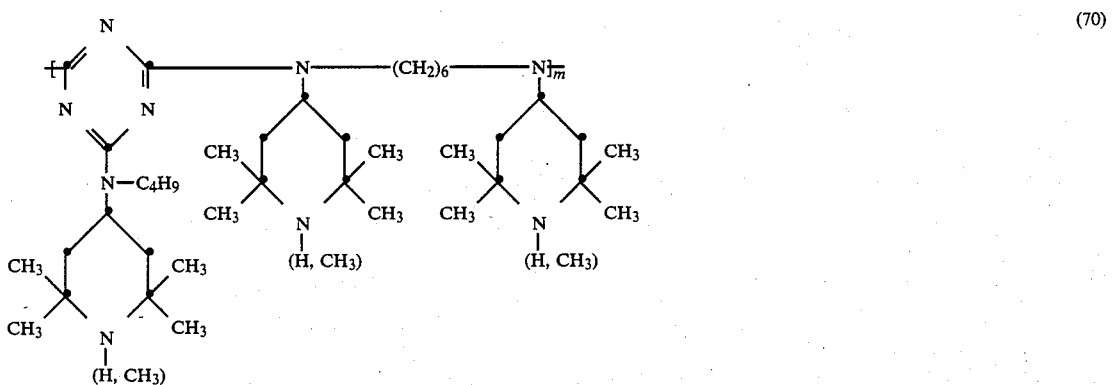
(70)

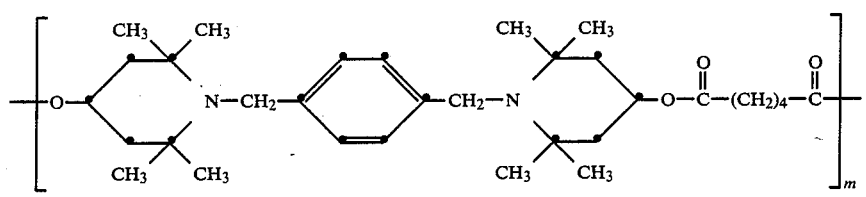
(71)
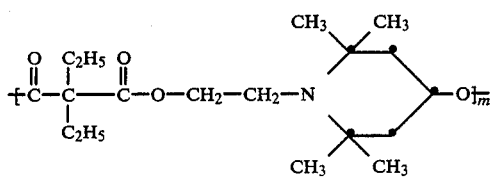
(72)
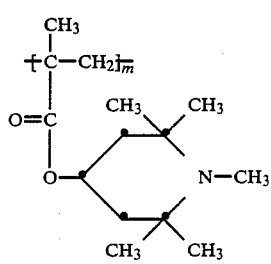
(73)
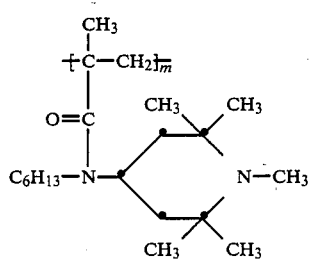
(74)
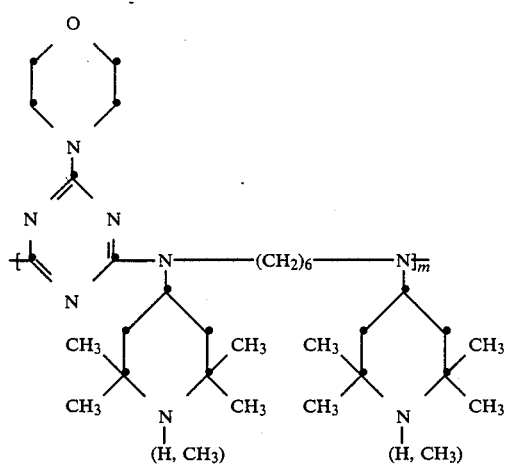
(75)
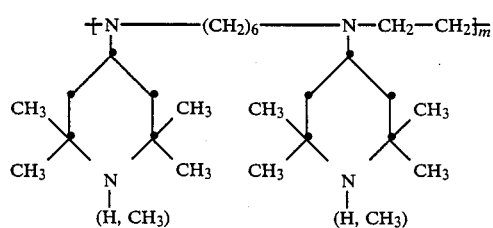
(76)

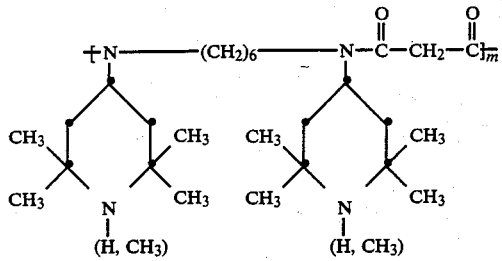

As already mentioned, those sterically hindered amines are preferred which contain ethylenically unsaturated groups, for example allyl, vinyl or maleate groups, and in particular acrylic or methacrylic groups, which copolymerize with the monomers. Therefore, those compounds of the formulae defined in the above sections (a) to (f) can be used preferably according to the invention which contain an ethylenic double bond in at least one of the substituents. This can be, for example, in the substituent $R^1$ or/and in the substituent in the 4-position of the piperidine ring. Examples of such compounds are the compounds 2, 3, 7, 11, 12a, 12b, 12c, 12d, 12e, 23, 24, 26, 32, 32a, 33a, 33b, 33c, 34, 35, 36, 37, 45 and 51a listed above.

In special cases, it can be of advantage to use a mixture of sterically hindered amines.

The light stabilizers from the class of sterically hindered amines are known, for example, from EP-A 114,784 and can be prepared by known processes.

Another group of light stabilizers, which is also important besides the hindered amine type, are the UV absorbers which belong to various classes of compounds. UV absorbers are also suitable for stabilizing polymer microparticles, according to the invention. The first class of such UV absorbers is represented by the 2-(2-hydroxyphenyl)-benzotriazoles, of which the following structural types are particularly suitable for the polymer microparticles according to the invention:

(A) Compounds of the formula VII

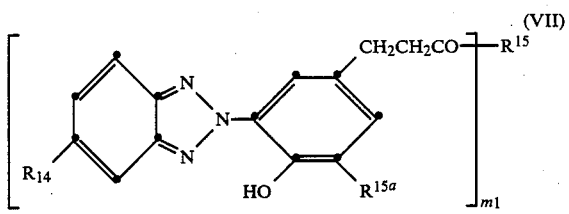

in which $R^{14}$ is H, Cl, $C_1$-$C_4$alkyl or $C_1$-$C_4$alkoxy (preferably H), $R^{15a}$ is hydrogen or $C_1$-$C_{18}$alkyl, cyclohexyl, $C_3$-$C_8$alkenyl, $C_7$-$C_{15}$aralkyl, Cl or

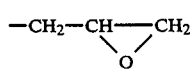

and $m_1$ is one of the numbers 1 or 2, and in which $R^{15}$ (a) in the case of $m_1 = 1$, is

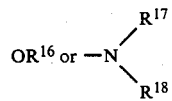

and
(b) in the case of $m_1 = 2$, is one of the divalent radicals

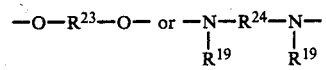

in which $R^{16}$ is $C_1$-$C_{18}$alkyl, $C_5$-$C_{12}$cycloalkyl, straight-chain or branched $C_2$-$C_{18}$alkenyl, $C_6$-$C_{14}$aryl, $C_7$-$C_{15}$alkaryl, $C_7$-$C_{15}$aralkyl or

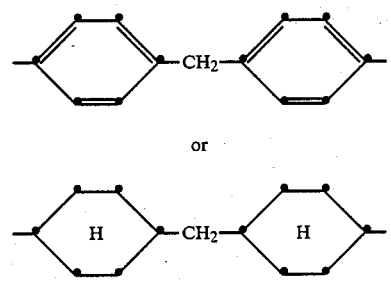

$R^{17}$ and $R^{18}$ independently of one another are H, straight-chain or branched $C_1$-$C_{18}$alkyl, straight-chain or branched $C_3$-$C_{18}$alkyl which is interrupted once or several times by —O— or —$NR^{19}$—, $C_5$-$C_{12}$cycloalkyl, $C_6$-$C_{14}$aryl, $C_7$-$C_{15}$alkaryl, $C_7$-$C_{15}$aralkyl or straight-chain or branched $C_3$-$C_8$alkenyl, or $R^{17}$ and $R^{18}$ together with the N atom, to which they are linked, form a pyrrolidine, piperidine, piperazine or morpholine ring, $R^{19}$ is H or straight-chain or branched $C_1$-$C_{18}$alkyl, $R^{22}$ is straight-chain or branched $C_1$-$C_{18}$alkyl or $C_3$-$C_{18}$alkenyl, $C_5$-$C_{12}$cycloalkyl, $C_6$-$C_{14}$aryl, $C_7$-$C_{15}$aralkyl or $C_7$-$C_{15}$alkaryl, $R^{23}$ is $C_2$-$C_{12}$alkylene, $C_4$-$C_8$alkenylene, $C_4$-alkynylene, cyclohexylene, straight-chain or branched $C_4$-$C_{18}$alkylene which is interrupted once or several times by —O—, $R^{24}$ is straight-chain or branched $C_2$-$C_{12}$alkylene which may be interrupted once or several times by —O—, cyclohexylene,

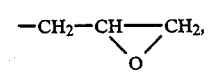

or $R^{24}$ and $R^{19}$ together with the two nitrogen atoms form a piperazine ring.

Those compounds of the formula VII should be singled out in which $R^{14}$ is —$OR^{16}$ or —O—$R^{23}$—O— and, amongst these, especially those in which $R^{16}$ is alkyl or alkenyl and $R^{23}$ is alkylene or alkenylene, or alkylene which is interrupted once or several times by 0, for example —$CH_2(CH_2OCH_2)_{r_1}CH_2$— with $r_1 = 1$ to 9.

An alkyl radical $R^{14}$ can be, for example, methyl, ethyl, propyl, isopropyl, butyl and tert-butyl, and an alkoxy radical $R^{14}$ can be, for example, methoxy, ethoxy, propoxy and butoxy.

$R^{16}$, $R^{17}$, $R^{18}$, $R^{19}$, $R^{21}$ and $R^{22}$ can, for example, be the following alkyl radicals: methyl, isopropyl, n-butyl, sec-butyl, tert-butyl, tert-amyl, 2-ethylhexyl, n-octyl, 1,1,3,3-tetramethylbutyl, n-dodecyl, 1,1,7,7,-tetramethyloctyl and n-octadecyl.

$R^{17}$ be 3 and 8alkyl radicals which are interrupted by —S—, —O— or —NR$^{19}$—: methoxyethyl, ethoxyethyl, butoxyethyl, butoxypropyl, methylthioethyl, $CH_3OCH_2CH_2OCH_2CH_2$—, $CH_3CH_2OCH_2CH_2OCH_2CH_2$—, $C_4H_9OCH_2CH_2OCH_2CH_2$—, dodecyloxypropyl, —$CH_2CH_2$—NH—$C_4H_9$, —$CH_2CH_2CH_2NH$—$C_8H_{17}$ and

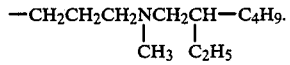

$R^{16}$, $R^{17}$, $R^{18}$ and $R^{22}$ can, for example, be the following $C_5$–$C_{12}$-cycloalkyl radicals: cyclopentyl, cyclohexyl, cyclooctyl or cyclododecyl.

$R^{17}$ and $R^{18}$ can, for example, be the following alkenyl radicals: allyl, methallyl, 2-n-hexenyl and 4-n-octenyl.

An alkenyl radical $R^{16}$ can be as defined for alkenyl radicals $R^{17}$ and $R^{18}$ or it can, for example, be —CH=$CH_2$, 10-n-undecenyl or 9-n-octadecenyl.

$R^{16}$, $R^{17}$, $R^{18}$, $R^{21}$ and $R^{22}$ independently of one another can, for example, be the following $C_7$–$C_{15}$aralkyl radicals: benzyl, α-phenylethyl,β-phenylethyl and 4-tert-butylbenzyl.

$R^{16}$, $R^{17}$, $R^{18}$ and $R^{22}$ independently of one another can, for example, be the following $C_6$–$C_{14}$aryl radicals: phenyl, α-naphthyl and β-naphthyl.

$C^7$–$C_{15}$Alkaryl radicals $R^{16}$, $R^{17}$, $R^{18}$, $R^{21}$ or $R^{22}$ can be a tolyl, xylyl, ethylphenyl, isopropylphenyl, n-butylphenyl, tert-butylphenyl, octylphenyl, di-tert-butylphenyl or nonylphenyl radical.

Alkyl in an —$SO_2$—$C_1$-$C_4$alkyl radical $R^{21}$ can be a methyl, ethyl, n-propyl, isopropyl, n-butyl, sec-butyl or tert-butyl radical.

Aryl in an —$SO_2$—$C_6$-$C_{14}$aryl radical $R^{21}$ is, for example, phenyl, α-naphthyl or β-naphthyl.

Alkaryl in an —$SO_2$—$C_7$–$C_{18}$alkaryl radical $R^{21}$ independently is as defined for $R^{16}$.

$C_2$–$C_8$Alkylene radicals $R^{23}$ and $R^{25}$ can, for example, be the following radicals: ethylene, propylene, butylene, hexylene and octylene.

An alkylene radical $R^{24}$ can independently be as defined for $R^{23}$ or, in addition, can also be a higher-molecular group such as decylene or dodecylene.

A $C_4$–$C_8$alkenylene radical $R^{23}$ can, for example, be the following group: butenylene.

Straight-chain or branched $C_4$–$C_{10}$alkylene groups interrupted by —O— in the case of $R^{23}$ and $R^{25}$ can, for example, be the following groups:

—$CH_2CH_2OCH_2CH_2$—

—$CH_2CH_2OCH_2CH_2OCH_2CH_2$— —$CH_2CH_2OCH_2CH_2OCH_2CH_2OCH_2CH_2$—.

Typical representatives of compounds of the formula VII in which m is the number 1 are the following: 2-[2-hydroxy-3-$R_o$-5-(2-carbomethoxyethyl)phenyl]-benzotriazole, 2-[2-hydroxy-3-$R_o$-5-(2-carbomethoxyethyl)-phenyl]-5-chlorobenzotriazole, 2-[2-hydroxy-3-$R_o$-5-(2-carbocyclohexyloxyethyl)phenyl]-benzotriazole, 2-[2-hydroxy-3-$R_o$-5-(2-carbooctyloxyethyl)phenyl]-benzotriazole, 2-2-hydroxy-3-$R_o$-5-[2-carbo-(2-ethylhexyloxy)ethyl]-phenyl-benzotriazole, 2-[2-hydroxy-3-$R_o$-5-(2-carboisodecyloxyethyl)-phenyl]-benzotriazole, the $R^{18}$ $C_2$ following 2-[2-hydroxy-3-$R_o$-5-(2-carbododecyloxyethyl)-phenyl]-benzotriazole, 2-[2-hydroxy-3-$R_o$-5-(2-carbododecyloxyethyl)-phenyl]-5-chlorobenzotriazole, 2-[2-hydroxy-3-$R_o$-5-(2-carbooctyloxyethyl)-phenyl-5-chlorobenzotriazole, 2-2-hydroxy-3-$R_o$-5-[2-carbo-(2-ethylhexyloxy)-ethyl]-phenyl-5-chlorobenzotriazole, 2-[2-hydroxy-3-$R_o$-5-(2-carbopiperidylamidoethyl)-phenyl]-benzotriazole and 2-[2-hydroxy-3-$R_o$-5-(2-carbomorpholinamidoethyl)-phenyl]-benzotriazole.

Typical representatives of compounds of the formula VII in which $m_1$ is the number 2 are the following:

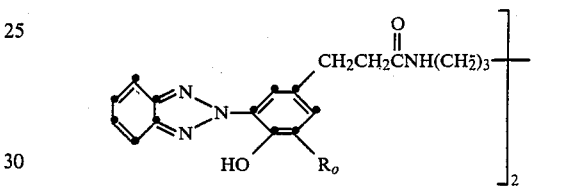

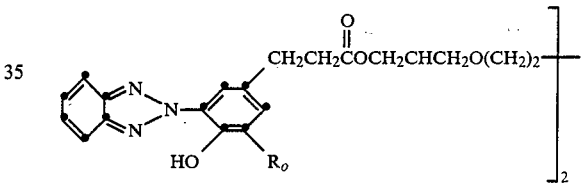

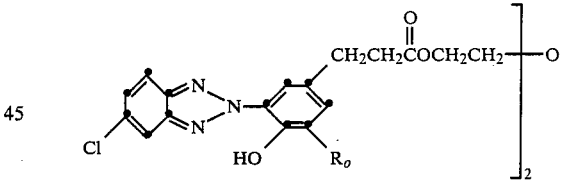

Further preferred compounds of the formula VII are: 2-[2-hydroxy-3-$R_o$-5-(2-carbo-n-octyloxyethyl)-phenyl]-benzotriazole, 2- 2-hydroxy-3-$R_o$-5-[2-carbo-(2-ethylhexyl)-oxyethyl]-phenyl -benzotriazole, 2-[2-hydroxy-3-$R_o$-5-(2-carbo-n-octyloxyethyl)-phenyl]-5-chlorobenzotriazole and 2- 2-hydroxy-3-$R_o$-5-[2-carbo-(2-ethylhexyl)-oxyethyl]-phenyl -5-chlorobenzotriazole, and the compound of the formula

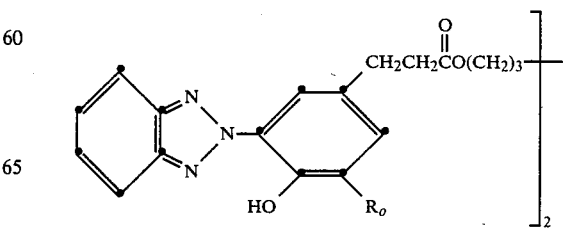

In all the above compound names and formulae, $R_o$ is H, $CH_3$ or t-butyl.

In certain cases, it can be of advantage to use a mixture of two or more compounds of the formula VII. An example is a mixture of 2-[2-hydroxy-3-tert-butyl-5-(2-carbo-n-octyloxyethyl-phenyl]-5-chlorobenzotriazole and 2- 2-hydroxy-3-tert-butyl-5-[2-carbo-(2-ethylhexyl)-oxyethyl]-phenyl-5-chlorobenzotriazole in a 1:1 weight ratio.

(B) Compounds of the formula VIII

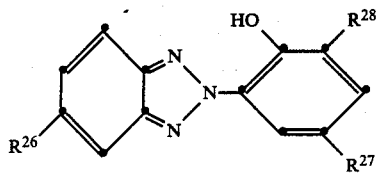

in which $R^{26}$ is H, chlorine or carboxyl, $R^{27}$ is straight-chain or branched, substituted or unsubstituted $C_1$–$C_{18}$alkyl, $C_7$–$C_{15}$aralkyl, $C_2$–$C_3$alkenyl or the group

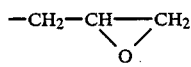

and $R^{28}$ is H or independently is as defined for $R^{27}$.

Substituted or unsubstituted $C_1$–$C_{18}$alkyl radicals $R^{27}$ and $R^{28}$ can here independently of one another be as defined above for $R^{16}$.

$C_7$–$C_{15}$Aralkyl radicals $R^{27}$ and $R^{28}$ can independently of one another be, for example, benzyl, α-phenylethyl, β-phenylethyl, α,α-dimethylbenzyl or 4-tert-butylbenzyl.

Examples of suitable compounds of the formula VIII are

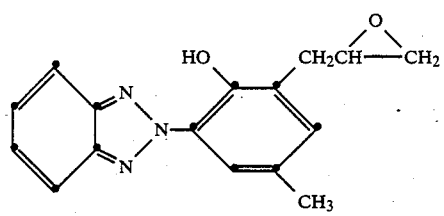

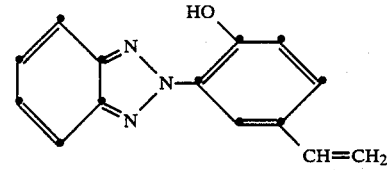

(C) Compounds of the formula IX

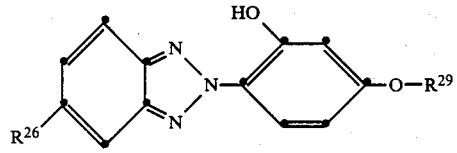

in which $R^{26}$ is as defined above and $R^{29}$ is straight-chain or branched $C_1$–$C_{18}$alkyl which is unsubstituted or substituted by epoxy groups and which can be interrupted one or several times by —O—

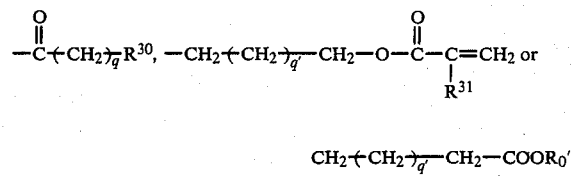

$q$ is an integer from 1 to 12, $R^{30}$ is

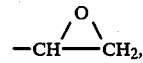

$R^{31}$ is hydrogen or methyl, $q'$ is 0 or 1 and $R_o'$ is $C_1$–$C_{18}$alkyl or ω-(meth)acryloyloxy-$C_1$–$C_{18}$alkyl.

A substituted $C_1$–$C_{18}$alkyl radical $R^{29}$ is here preferably substituted by epoxy groups and particularly preferably by one epoxy group.

An example of suitable light stabilizers of the formula IX is:

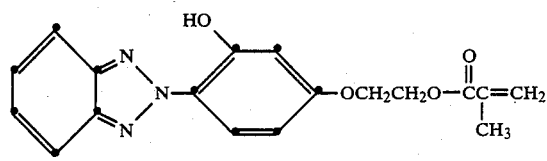

(D) Compounds of the formula X

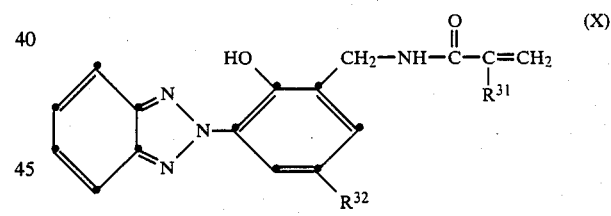

in which $R^{31}$ is as defined above and $R^{32}$ is hydrogen or straight-chain or branched $C_1$–$C_{18}$alkyl.

A $C_1$–$C_{18}$alkyl radical $R^{32}$ can here be as defined above for $R^{16}$ and preferebly is unsubstituted $C_1$–$C_{12}$alkyl. Examples of 2-(2-hydroxyphenyl)-benzotriazoles of this structural type are:

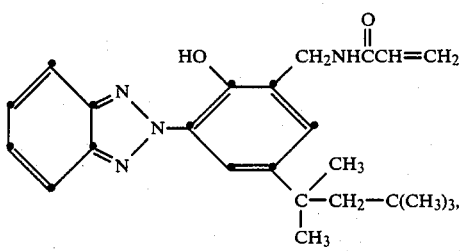

-continued

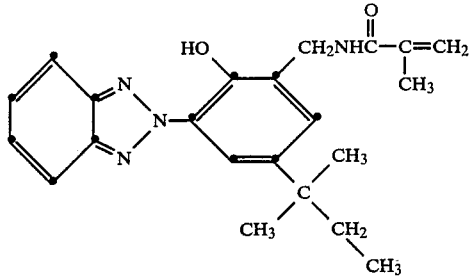

and the compounds of the above formulae in which H or CH₃ takes the place of the t-alkyl radicals in the p-position to the hydroxyl group.

(E) Compounds of the formula XI

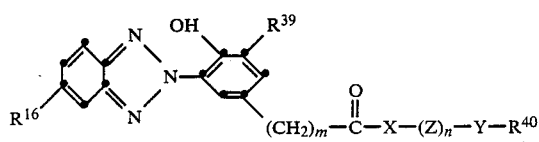

in which X is —O— or —N(R⁴¹)—, Y is —O— or —N(R⁴²)—, Z is $C_2$-$C_{12}$alkylene, $C_4$-$C_{12}$alkylene which is interrupted by one to three —N(R⁴⁷)-groups and/or oxygen atoms, butenylene, butynylene, cyclohexylene or phenylene, m is the number 0, 1 or 2, n is 1 or, if X and Y are —N(R⁴¹)— or —N(R⁴²)— respectively, can also be 0, R⁴⁶ is hydrogen, chlorine, $C_1$-$C_4$alkyl or $C_1$-$C_4$-alkoxy (preferably hydrogen), R³⁹ is hydrogen, $C_1$-$C_8$alkyl, $C_7$-$C_{15}$-aralkyl, $C_3$-$C_5$alkenyl or cyclohexyl and R⁴⁰ is a group —C(O)—C(R⁴³)=C(H)R⁴⁴ or, if Y is —N(R⁴²)—, forms together with R⁴² a group —C(O)—CH=CH—C(O)—, R⁴³ being hydrogen or methyl and R⁴⁴ being hydrogen, methyl or —C(O)—X—R⁴⁵, with R⁴⁵ being hydrogen, $C_1$-$C_{12}$alkyl or a group of the formula

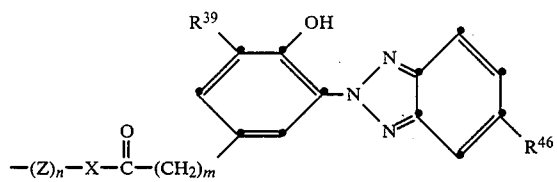

in which the symbols R⁴⁶, R³⁹, X, Z, m and n are as defined above, and R⁴¹, R⁴² and R⁴⁷ independently of one another are hydrogen, $C_1$-$C_{12}$alkyl, $C_3$-$C_{12}$alkyl interrupted by 1 to 3 oxygen atoms, cyclohexyl or $C_7$-$C_{11}$aralkyl, and, if Z is ethylene, R⁴¹ can also form ethylene together with R⁴².

Preferably, in the formula XI, R⁴⁶ is hydrogen or Cl, X is O or NH, especially O, m is 2, n is 1, Z is $C_2$-$C_6$alkylene, cyclohexylene or phenylene, Y is O or NH, especially O, and R⁴⁰ is —C(O)—C(R⁴³)=C(H)R⁴⁴ with R⁴⁴ =hydrogen or methyl.

Examples of benzotriazoles of the formula XI are: (2-(meth)acrylyloxy)cyclohexyl 3-(2H-benzotriazol-2-yl)-4-hydroxy-5-R₀-benzenepropanote, (2-(meth)acrylyloxy)-cyclohexyl 3(5-chloro-2H-benzotriazol-2-yl)-4-hydroxy-5-R₀-benzenepropanoate, N-(2-(meth)acrylyloxyethyl)-3-(2H-benzotriazol-2-yl)-4-hydroxy-5-R₀-benzenepropanamide, N-(2-(meth)acrylyloxyethyl)-3-(5-chloro-2H-benzotriazol-2-yl)-4-hydroxy-5-R₀-benzenepropanamide, N-(3-(meth)acrylyloxypropyl)-3-(2H-benzotriazol-2-yl)-4-hydroxy-5-R₀-benzenepropanamide, (2-(meth)acrylyloxy)-propyl 3-(2H-benzotriazol-2-yl)-4-hydroxy-5-R₀-benzenepropanoate, (2-(meth)acrylyloxy)-butyl-3-(2H-benzotriazol-2-yl)-4-hydroxy-5-R₀-benzenepropanoate, (2-(meth)acrylyl-2-phenyl)-ethyl 3-(2H-benzotriazol-2-yl)-4-hydroxy-5-R₀-benzenepropanoate, (2-(meth)acrylyl-3-phenoxy)-propyl 3-(2H-benzotriazol-2-yl)-4-hydroxy-5-R₀-benzenepropanoate and N-(2-(4-methoxy-1,4-dioxo-cis-but-2-en-1-yloxy)-ethyl)-3-(2H-benzotriazol-2-yl)-4-hydroxy-5-R₀-benzenepropanamide.

In the above compound names, R₀ is H, CH₃ or t-butyl, H and CH₃ being preferred.

(F) Compounds of the formula XIa

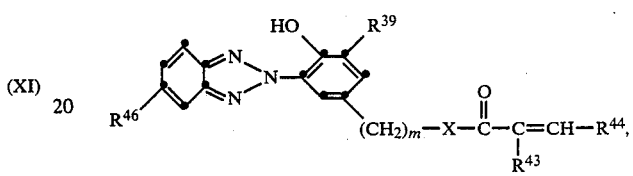

in which the general symbols are as defined under the formula XI.

The same preferences as for those of the formula XI apply analogously to the compounds of the formula XIa.

(G) Compounds of the formula XII

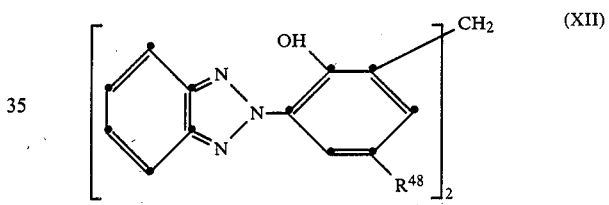

in which R⁴⁸ is substituted or unsubstituted $C_1$-$C_{18}$alkyl, $C_7$-$C_{15}$aralkyl or $C_2$-$C_3$alkenyl.

A substituted or unsubstituted alkyl radical R⁴⁸ can here be, for example, as defined above for R¹⁶.

The 2-(2-hydroxyphenyl)-benzotriazoles which can be used as light stabilizers for the microparticles are known or can be prepared by methods known per se, for example according to EP-A 57,160, EP-A 133,165 and other documents, known to those skilled in the art, relating to 2-(2-hydroxyphenyl)-benzotriazoles. Most of the light stabilizers (piperidine light stabilizers and UV absorbers) described in this application are also described in EP-A 226,538.

A further type of suitable light stabilizers from the UV absorber group is represented by 2-hydroxybenzophenones which have, for example, a structure according to the formula XIII

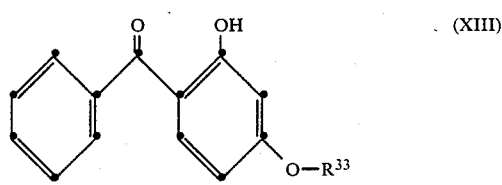

in which R³³ is straight-chain or branched $C_1$-$C_{18}$alkyl which may be interrupted once or several times by —O— and is unsubstituted or substituted by epoxy groups, or is

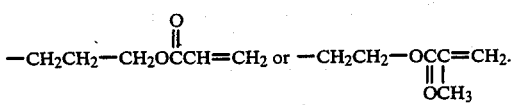

Examples of suitable 2-hydroxybenzophenones are the 4-methoxy, 4-octyloxy, 4-decyloxy or 4-dodecyloxy derivatives, and these may be substituted by epoxy groups.

Further classes of suitable UV absorbers comprise 2,4-bis-(2'-hydroxyphenyl)-6-alkyl-s-triazines, for example the 6-ethyl, 6-heptadecyl or 6-undecyl derivatives, and oxalic acid diamides, in particular oxalic acid dianilides, for example 4,4'-di-octyloxy-oxanilide, 2,2'-dioctyloxy-5,5'-di-tert-butyl-oxanilide, 2,2'-didodecyloxy-5,5'-di-tert-butyloxanilide, 2-ethoxy-2'-ethyl-oxanilide, N,N'-bis-(3-dimethylaminopropyl)oxalamide, 2-ethoxy-5-tert-butyl-2'-ethyl-oxanilide and its mixture with 2-ethoxy-2'-ethyl-5,4'-di-tert-butyl-oxanilide and mixtures of o- and p-methoxy-and o- and p-ethoxy-di-substituted oxanilides.

Other possible light stabilizers for the microparticles are cinnamic acid derivatives of the formula XIV

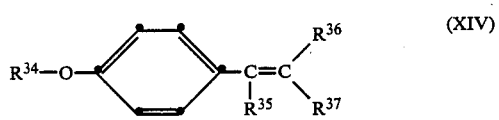

in which $R^{34}$ is straight-chain or branched $C_1-C_{18}$alkyl which may be interrupted by —O—, $R^{35}$ is hydrogen, $C_1-C_4$alkyl, methoxy or phenyl, $R^{36}$ and $R^{37}$ independently of one another are cyano or —C(O)O$R^{38}$ groups and $R^{38}$ is straight-chain or branched $C_1-C_{18}$alkyl which may be interrupted by —O—. Examples of suitable cinnamic acid derivatives are ethyl and isooctyl α-cyano-β,β-diphenylacrylate, methyl α-carbomethoxy-cinnamate and methyl α-cyano-β-methoxycinnamate.

As already mentioned above, those light stabilizers are preferred which can be chemically anchored in, that is to say copolymerized into, the polymer microparticles according to the invention. Generally this is the case with light stabilizers, in particular those from the classes defined above, which contain at least one reactive substituent with at least one ethylenic double bond.

In general, 2,2,6,6-tetraalkylpiperidine derivatives (in particular those listed in the above section (a) to (f)) and 2-(2-hydroxyphenyl)-benzotriazoles as well as mixtures of these two types of light stabilizers (in particular those listed in the above sections (A) to (F)) are preferably employed as light stabilizers. The compounds of the formulae II, III, IV, VA-VC and VI (especially those of the formulae II, III, VA and VI) and those of the formulae VII, IX, X, XI and XIa are here to be mentioned in particular. With very particular preference, compunds of the type of the formulae II, III and XI are employed.

Since proton-donating substituents can interfere with the group transfer polymerization, those light stabilizers are advantageously used for microparticles according to the invention, which can be prepared by group transfer polymerization, which do not contain any such groups, for example —OH, COOH— or other acid groups. However, it depends on the position of such groups in the molecule whether they have the said effect. The OH group in the phenyl radical of the 2-(2-hydroxyphenyl)benzotriazole UV absorbers hardly interferes, if at all, with the polymerization, depending on the further substitution, and especially does not interfere if there are no tertiary substituents in the ortho-position to the OH group. However, even compounds having the last-mentioned substituents can be used for stabilizing the microparticles according to the invention, in particular for stabilizing the "arms" into which they are incorporated, for example terminally.

For the reasons given above, those hindered amines (especially the piperidine compounds carrying at least one group of the formula I, for example as defined in sections (a) to (f); see also formulae II to VI) are also preferred according to the invention which carry a substituent other than H on the hindered N atom (i.e., for example, on the piperidine N atom). However, the microparticles according to the invention can also be formed with hindered amines which are unsubstituted on the N atom. As mentioned, the hindered amines should preferably not contain any OH and COOH groups.

In the process according to the invention, the light stabilizer(s) is or are added in a quantity from 0.1 to 30% by weight and preferably 0.5 to 10.0% by weight, each relative to the monomers in the particular polymerization step. The addition can be made at the start, together with the monomers, continuously during or towards the end of the polymerization process. In this way, uniform distribution of the light stabilizer(s) in the microparticles or enrichment in the outer layers is achieved. This ensures that the light stabilizer(s) is or are physically or chemically anchored in the resulting polymer microparticles depending on its (their) nature. Preferably, the light stabilizer carries reactive groups, for example ester, epoxy, isocyanate, amino or amide groups or especially ethylenic double bonds, for example in (meth)acrylate or vinyl groups, by means of which it can be chemically bonded to the polymer and, if appropriate, can participate directly in the polymerizartion as already explained above.

The invention also relates to dispersions which contain the polymer microparticles according to the invention. For practical purposes, the microparticles are not isolated as such but processed further as a dispersion in the solvent, in which the polymerization or the deactivation of the "living" groups took place, or in another dispersing medium. The dispersants used can, in particular, be aromatic, aliphatic and cycloaliphatic hydrocarbons, but others, for example water, are also possible. Examples of hydrocarbons are benzene, toluene and especially higher-boiling aliphatic hydrocarbon fractions, for example those having a boiling range of 100°–200° C. The dispersions according to the invention contain the microparticles, for example, in a quantity from 10 to 90%, in particular 20 to 80%, for example 40 to 80%, relative to the dispersion.

The invention also relates to coating compositions wherein the film-forming material comprises
(a) 1 to 95% by volume of a disperse phase which contains microparticles according to the invention and
(b) 99 to 5% by volume of a liquid continuous phase which has a viscosity of 0.1 to 30 poise at room temperature and is capable of curing to give a film-forming polymer, the total volume of (a) and (b) being 100% and the disperse phase preferably participating in curing the coating. Phase (b) can here also contain one or more light stabilizers. The disperse phase contains preferably at least 50% by volume of microparticles.

Those coating compositions are preferred in which the film-forming material comprises 5 to 85, for example 15 to 85, % by volume of the disperse phase containing at least 50% by volume of microparticles according to the invention, and 95-15, for example 85-15%, by volume of the liquid continuous phase having a viscosity of 0.1 to 20 poise at room temperature.

Generally, the microparticles can here be added like an additive to a finished coating composition, or they can be employed in place of a corresponding porportion of the coating components, for example the acrylate or polyester component of a coating composition. In the latter case, the microparticles can participate (as a reactive component) in the curing of the coating.

The disperse phase can consist exclusively of polymer microparticles; however, in addition to the microparticles and, if appropriate, solvent, the disperse phase preferably also contains particles of pigment, filler and/or extender, such as are conventionally used in coating compositions. With advantage, these particles have a size of, for example, 0.1 to 5 μm, as is conventional in coating technology.

The polymer microparticles and the pigment, filler and/or extender particles are advantageously in a stable dispersion in a deflocculated state in the liquid continuous phase; this can be accomplished, for example, by means of known pigment dispersants. Alternatively, the liquid film-forming material in the continuous phase or a chemical variant thereof can itself be an effective dispersant.

The dispersing of the pigment can be carried out in the manner customary in coating technology, for example with the use of ball mills, bead mills, attrition mills or colloid mills.

Preferably, the disperse phase is capable of participating in the curing of the coating, presupposing that either the microparticle core or the dispersant part or both contain chemically reactive groups, by means of which they can participate in a curing reaction. If the capacity for participating in the curing reaction resides in the dispersant, the latter contains appropriate reactive groups, for example hydroxyl or carboxyl groups, which can be located in the solvated polymer part or in that part of the molecule which serves as an anchoring component for the microparticles.

As a result of the conditions described in the preceding paragraph, the disperse phase/continuous phase system can also itself form a two-component system, i.e. the film formation is accomplished by a reaction of the two phases with one another.

It is therefore a feature of the polmer microparticles according to the invention that, as a constituent of coating compositions, then can, if appropriate, participate in the curing thereof by means of reactive groups capable of condensation polymerization. This can be accomplished, for example, by using ethylenically unsaturated monomers which contain, for example, hydroxyl or carboxyl groups. Examples are hydroxyalkyl acrylates or methacrylates, such as hydroxyethylacrylate or hydroxyisopropyl methacrylate, or unsaturated carboxylic acids such as acrylic acid or methacrylic acid.

The other component of the coating compositions according to the invention is the liquid continuous phase which is capable of giving a polymer film when cured by means of addition or condensation polymerization.

Condensation polymerization is here to be understood as meaning in particular the polymerization by means of a reaction of pairs of functional groups with the formation of functional units which are not present in the monomers, in which case the reaction can, if appropriate, involve the evolution of low-molecular by-products.

Suitable constituents of the continuous phase are in particular curable or thermosetting resins which can be converted into a film-forming polymer by means of heating and/or addition of a catalyst. Examples of such resins are:

1. Phenol/formaldehyde resins, i.e. the product of the reaction of phenols with formaldehyde.

2. Amino/formaldehyde resins, for example urea/formaldehyde or melamine/formaldehyde resins, obtainable by reacting urea, melamine or other nitrogen-containing compounds with formaldehyde.

3. Crosslinkable acrylic resins which are derived from substituted acrylates, for example epoxy-acrylates, urethane-acrylates or polysteracrylates, and also acrylic resins which do not contain any olefinic double bond and he OH or/and COOH groups of which can participate in the condensation reaction.

4. Polyester resins and alkyd resins.

5. Polyurethane resins based on the reaction of diisocyanates or polyisocyanates with polyhydroxy compounds.

6. Epoxide resins, for example those obtained by reacting epichlorohydrin with bisphenol A.

The continuous phase can, in principle, consist of a single liquid substance or of a homogeneous liquid mixture of two or more substances.

A mixture of two or more substances is preferred, and this can be in the form of a one-component or two-component system.

If the continuous liquid phase is a one-component system, this contains the film-forming constituents in a storage-stable form, and curing can take place, for example, by mere heating, or a curing agent is added.

Suitable one-component systems are built up, for example, from one of the said thermosetting resins and, if appropriate, a further liquid substance, the so-called reactive diluent, which contains reactive groups, by means of which it can participate in the curing of the film-forming material, and which especailly contributes to improved flexibility of the coat film. The reactive diluent is, for example, a bifunctional monomer or oligomer having molecular weights up to about 1,000 and containing, in particular, OH groups, for example 2-6 OH groups. Examples of these are simple glycols or polyols such as butane-1,4-diol, and especially hydroxy-terminated oligomeric esters of polyalcohols with polycarboxylic acids and/or monocarboxylic acids. Examples of suitable reactive diluents are given in EP-A 3,166.

If the continuous liquid phase is a two-component system, this is prepared only just before application of the finished coating composition, by combining two liquid components which are mutually reactive and, in addition, are capable of forming a film.

In this case, the second component can co-react with the first component and thus form a cured film, as is the case, for example, with two-component polyurethane coatings. However, the second component can also be a catalyst for the curing reaction of the first component, the acid-catalyzed curing of amino resins being an example.

Those coating compositions are preferred according to the invention which are based on a crosslinkable acrylate, polyester/alkyd or polyurethane resin which, if appropriate, has been crosslinked with aminoplasts, polyisocyanate or polyepoxides.

The abovementioned two-component system of disperse and continuous phase, where the coating film is formed by reaction of the two phases with one another, may be mentioned here as a special case.

The coating compositions according to the invention can, in the continuous phase, contain a catalyst for curing the coating, which catalyst is added, depending on the nature of the film-forming material used, preferably in a quantity from 0.1 to 15% by weight, relative to the total continuous phase including any reactive diluent present.

If the continuous phase consists mainly of thermosetting resins, the catalyst is preferably an acidic catalyst or a catalyst which releases acid on heating, for example methanesulfonic acid, toluenesulfonic acid, phosphoric acid, half-esters of maleic acid, cyclohexylphosphonous acid, trichloroacetic acid, trifluoroacetic acid or a tetrahalogenophthalic acid and half-esters thereof.

In addition to the film-forming components, namely the disperse phase and the liquid continuous phase, the coating compositions according to the invention can contain an inert liquid diluent, for example up to 50 and in particular 30% by volume, which volatilizes under the conditions of the application of the coating composition to a substrate.

Examples of suitable inert solvents are aromatic and aliphatic hydrocarbons, halogenated hydrocarbons, lower alcohols or water.

It can be desirable to add further substances to the coating composition, which affect certain properties, for example the flow behaviour or the adhesion to a substrate. Such additives, which are in general added to the continuous phase, are known to those skilled in the art.

Preferably, the film-forming material in the coating compositions according to the invention consists of 10 to 80, for example 20 to 80, % by volume of liquid continuous phase.

The coating compositions according to the invention can be applied to a substrate by means of any conventional method known to those skilled in the art, for example by brushing, spraying, dipping or electrophoretic appication. The coatings and finishes based on the compositions according to the invention are dried after application and baked.

The coating compositions according to the invention are suitable for use in any type of industrial painting, for example for painting machines, vehicles, ships or structural components. They are of particular importance for vehicle painting. This may be either one-coat or multi-coat painting.

Coatings and finishes based on the coating compositions according to the invention are distinguished by improved weathering resistance, and especially by a very high light stability.

Moreover, the invention relates to the use of light-stabilized microparticles according to the invention as constituents of coating compositions.

In the dispersion which is obtained in the process according to the invention and which contains the polymer microparticles according to the invention, there are also, in addition to the actual microparticles (characteristics: size distribution preferably 0.01–20 μm and crosslinking), proportions of other polymers which are not microparticles in the above sense. These do not interfere with the use in coating compositions, so that the dispersions obtained can as a rule be employed directly. If required, however, the microparticles can also be isolated as such or purified by removal of other polymer fractions. The latter can be accomplished, for example, by reprecipitation in suitable solvents, in which the uncrosslinked fractions are soluble. This gives purified microparticle dispersions, from which the particles themselves can be isolated by suitable methods known per se, for example by spray-drying and especially by freeze-drying. The isolated microparticles can then likewise be characterized by methods conventional in polymer chemistry, for example by means of light-scattering measurements, scanning electron microscopy, determination of the size distribution, of the form, and the like. As already mentioned above, the microparticles have, in the ideal case, a spherical to oval shape. The isolation and characterization of polymer microparticles have been described in many literature references, for example by Funke et al., Progr. Colloid Polymer Sci. 57, 48–53 (1975).

The examples which follow are intended for a further illustration of the various aspects of the present invention, but do not represent any restriction whatsoever of the generally applicable principle of the present invention. In the examples, like everywhere else in the remainder of the description, parts and percentages are by weight, unless otherwise stated. In the preparation examples, the isolation of the microparticles as such is not always mentioned, for the sake of simplicity. This can be carried out in the manner explicitly described above.

Examples

Example 1

Stabilization of the microparticles in the "arms".

The apparatus used is a 1.5 liter sulfonation flask fitted with a stirrer, reflux condenser, thermometer and two rubber diaphragm inlets. The flask is flame-heated in vacuo and filled with dry argon gas. Subsequently, the sulfonation flask is filled with the following components, always under argon:

356 g (411 ml) of 1,2-dimethoxyethane,
3.5 g (4.05 ml) of 1-methoxy-2-methyl-1-trimethylsiloxypropene and
0.5 ml of 0.05 molar tetrabutylammonium fluoride trihydrate (TBAF) solution in 1,2-dimethoxyethane.

This reaction mixture is stirred under argon. In accordance with a precise time schedule (see below), the following components are then introduced into the reaction flask through the rubber diaphragm inlets by means of two different metering pumps:

| Components | Time in minutes | |
| --- | --- | --- |
| | start of addition | end of addition |
| I Mixture of 252 g of methyl methacrylate and 8.04 g of 4-methacryloyloxy-1,2,2,6,6-pentamethylpiperidine | 0 | 40 |
| II 16.6 g of ethylene glycol dimethacrylate | 50 | 90 |

During the dropwise addition of I, the internal temperature of the solution rises up to about 70° C., due to the exothermic heat of reaction. No additional exothermic effect is to be observed when II is added dropwise. After a total reaction time of 100 minutes (10 minutes of final stirring), the reaction is stopped with 6 ml of methanol. The microparticle solution, which has become relatively viscous, is diluted with 500 ml of ethyl acetate, and the microparticles are precipitated by pouring the solution dropwise into about 8 liters of hexane.

This gives 208.9 g of white microparticle granules (microgel granules) which are filtered off with suction, washed with a little methanol and hexane, dried in a drying cabinet and then ground. The microparticles are readily soluble in ethyl acetate and show the following molecular weight values: $\overline{M}n = 3,850$, $\overline{M}w = 45,450$. The light stabilizer content is 3%, relative to total solids.

In place of the precipitated microparticles which can be isolated as described above, the solution of the light-stabilized microparticles in 1,2-dimethoxyethane can also be used for the application as a coating. The $\overline{M}n/\overline{M}w$ values determined by GPC (gel permeation chromatography) are virtually the same. The solids content is 43.5%.

Example 2

Stabilization of the microparticles in the "cores".

Taking 252 g of methyl methacrylate in place of the mixture I in Example 1 and taking 28.4 g of the piperidine light stabilizer 1-[2-methacryloyloxyethyl]-4-methacryloyloxy-2,2,6,6-tetramethylpiperidine in place of the crosslinking agent II, and following the procedure of Example 1 in other respects, 243.8 g of a white microgel stabilized in the core are obtained. The stabilizer content is 10.1%, relative to the total solids content. $\overline{M}n = 2,750$, $\overline{M}w = 47230$.

Example 3

Stabilization of the microparticles in the "cores".

252 g of methyl methacrylate are again used in place of the mixture I according to Example 1. A mixture consisting of 12.09 g of ethylene glycol dimethacrylate and
8.04 g of 1-[2-methacryloyloxyethyl]-4-methacryloyloxy-2,2,6,6-tetramethylpiperidine (=mixture III) is used in place of the crosslinking agent II. Following the procedure of Example 1 in other respects, 233.2 g of a white microgel stabilized in the core are obtained. The stabilizer content is 3%, relative to the total solids content $\overline{M}n = 4,120$, $\overline{M}w = 40,000$.

Example 4

Stabilization of the microparticles in the "arms" and in the "cores".

Using the mixture I described in Example 1 and the mixture, described in Example 3, of the crosslinking agent (mixture III), and following the procedure of Example 1 in other respects, a white microgel stabilized in the core and in the arms is again obtained. The stabilizer content is 3% in the core and 3% in the arms, relative to the total solids content $\overline{M}n = 9,994$, $\overline{M}w = 25,060$.

Example 5

Stabilization of the microparticles in the "arms".
Using the following mixture
252 g of methyl methacrylate
8.04 g of 4-(N-butyl)-acrylamido-1,2,2,6,6-pentamethylpiperidine in place of mixture I in Example 1 and following the procedure of Example 1 in other respects, 234 g of a white microgel stabilized in the arms are obtained. The stabilizer content is 3%, relative to the total solids content. $\overline{M}n = 19,189$, $\overline{M}w = 128,921$.

Example 6

Stabilization of the microparticles in the "arms".
Using the following mixture
252 g of methyl methacrylate
8.04 g of 1-acetyl-2,2,6,6-tetramethyl-4-methacryloyloxypiperidine (compound 26)

in place of mixture I in Example 1 and following the procedure of Example 1 in other respects, 225 g of a white microgel stabilized in the arms are obtained. The stabilizer content is 3%, relative to the total solids content. $\overline{M}n = 4,774$, $\overline{M}w = 26,257$.

Example 7

The apparatus used is a 2.5 liter sulfonation flask fitted with a stirrer, reflux condenser, thermometer and rubber diaphragm inlet. The flask is flame-heated in vacuo and filled with dry argon gas. Subsequently, the sulfonation flask is filled with the following components, always under argon:

1,189.00 g of ethylene glycol dimethyl ether
15.54 g of xylene
14.00 g of 1-trimethylsiloxy-1isobutoxy-2-methylpropene.

100 μl of a 1.0 molar solution of tetrabutylammonium bifluoride (TBAHF$_2$) in ethylene glycol dimethyl ether are added to this mixture through the rubber diaphragm by means of a syringe.

This reaction mixture is stirred under argon. In accordance with a precise time schedule (see below), the following components are then introduced into the reaction flask through the rubber diaphragm by means of two different metering pumps:

| Components | Time in minutes start of addition | end of addition |
|---|---|---|
| I 300 μl of 1.0M TBAHF$_2$ and 5.3 g of ethylene glycol dimethyl ether | 0 | 90 |
| II mixture of | | |
| 844.4 g of methyl methacrylate and 18.0 g of 4-methacryloyloxy-1,2,2,6,6-pentamethylpiperidine | 0 | 40 |
| III 55.8 g of ethylene glycol dimethacrylate | 55 | 70 |

After a total reaction time of 100 minutes, the reaction is stopped by means of 20 g of methanol.

The resulting polymer microparticle dispersion has a solids content of 43.5%, containing about 2% of light stabilizer, relative to the total solids content.

Example 8

Stabilization of the microparticles in the "arms".
The apparatus used and the preparation are the same as in Example 1. The following substances are introduced into the reaction vessel, under argon:
170 g of 1,2-dimethoxyethane
1.7 ml of 1-methoxy-1-(trimethylsiloxy)-1-propene
0.3 ml of 0.05 molar tris-(dimethylamino)-sulfonium bifluoride (TASHF$_2$) solution.

Controlled by two flow controllers, the following substances are then added dropwise to the clear colourless solution through the rubber diaphragms in accordance with a precise time schedule.

| Components | Time in minutes | |
|---|---|---|
| | start of addition | end of addition |
| I 0.96 ml of 0.05 M TASHF$_2$ solution | 0 | 60 |
| II 126 g of methyl methacrylate | 0 | 40 |
| III 8.3 g of ethylene glycol dimethacrylate | 50 | 60 |
| IV 4.02 g of 2-2-hydroxy-3-t-butyl-5-[2-(2-acryloyloxy-cyclohexylcarbonyl)-ethyl]-phenyl-benzotriazole dissolved in 10 ml of dimethoxyethane | 70 | 80 |

The reaction proceeds exothermically up to an internal temperature of about 60° C. After a reaction time of 60 minutes, the reaction solution becomes markedly more viscous. When the UV absorber is added, the solution assumes a yellowish colour. After a total reaction time of 90 minutes, the reaction is stopped by means of 10 ml of methanol. The yellowish reaction solution is decolorized immediately. The microparticles isolated by precipitation in hexane or methanol show a marked absorption at 343 nm in the UV spectrum. The UV absorber content is 3%, relative to the total solids content. $\overline{M}n=9{,}751$, $\overline{M}w=21{,}216$.

Example 9 stabilization of the micropartles in the "arms".

Using the same quantity of 2- 2-hydroxy-3-methyl-5-[2-(2-methacryloyloxy-cyclohexyloxycarbonyl)-ethyl]-phenyl -benzotriazole in place of 4-methacryloyloxy-1,2,2,6,6-pentamethylpiperidine in Example 1 and exactly following the procedure of Example 1 in other respects, a light-stabilized polymer microparticle dispersion with 3% of UV stabilizer, relative to the solids content, is likewise obtained, and this is used as such for applying a coating.

Example 10

Using the same quantity of 2- 2-hydroxy-5-[2-(2-methacryloyloxy-cyclohexyloxycarbonyl)-ethyl]-phenyl -benzotriazole in place of the UV absorber in Example 9 and following the procedure of Example 9, a light-stabilized polymer microparticle dispersion with 3% of UV stabilizer, relative to the solids content, is likewise obtained, and this is also used directly for applying a coating.

Example 11

Using the same quantity of 2- 2-hydroxy-3-methyl-5-[2-(2-methacryloyloxy-cyclohexyloxycarbonyl)-ethyl]-phenyl -benzatriazole in addition to the 8.04 g of 4-methacryloyloxy-1,2,2,6,6-pentamethylpiperidine and exactly following the procedure of Example 1 in other respects, a light-stabilized polymer microparticle dispersion which contains about 2% each of benzotriazole UV absorber and 4-methacryloyloxy-1,2,2,6,6-pentamethylpiperidine, relative to the solids content, is likewise obtained.

Example 12

The same apparatus with the same preparations as described in Example 7 is used again. Under argon,
  700.0 g of tetrahydrofuran (THF) (made absolutely dry over potassium)
  5.0 g of xylene (absolutely dry) and
  7.0 g of 1-trimethylsiloxy-1-methoxy-2-methylpropene
are put into the reaction flask.

50 μl of a 1M tris(dimethylamino)-sulfonium difluoride solution (TASHF$_2$) in ethylene glycol dimethyl ether are added to this mixture through the rubber diaphragm by means of a syringe.

The mixture is then stirred under argon and the following components are added in accordance with a precise time schedule (see below):

| Components | Time in minutes | |
|---|---|---|
| | start of addition | end of addition |
| I 40.7 g of hexanediol dimethacrylate | 0 | 10 |
| II 400 μl of 1.0M TASHF$_2$ solution and 4.1 g of THF | 0 | 90 |
| III Mixture of: 199.5 g of methyl methacrylate and 4.0 g of 4-methacryloyloxy-1,2,2,6,6-pentamethylpiperidine | 40 | 55 |
| IV Mixture of: 255.8 g of butyl acrylate and 5.2 g of 4-methacryloyloxy-1,2,2,6,6-pentamethylpiperidine | whole amount after 85 minutes | |

After a reaction time of 2 hours, the polymerization is stopped by addition of 10.0 g of methanol.

This gives a polymer microparticle dispersion of about 41.9% solids content, which contains 1.8% of light stabilizer, relative to the total solids content.

Example 13

The procedure followed is analogous to that of Example 12.

In place of the 4 g of piperidine light stabilizers mentioned in mixture III, the following stabilizers are used:
  (13a) 4-(N-butyl)-acrylamido-1,2,2,6,6-pentamethylpiperidine $\overline{M}n=19{,}999$, $\overline{M}w=128{,}921$.
  (13b) 1-Acetyl-2,2,6,6-tetramethyl-4-methacryloyloxy-piperidine $\overline{M}n=4{,}774$, $\overline{M}w=26{,}257$.
  (13c) 2- 2-Hydroxy-5-[2-(2-methacryloyloxy-cyclohexyloxycarbonyl)-ethyl]-phenyl -benzotriazole.

Example 14

The procedure followed is as described in Example 12, but with the difference that, in place of crosslinking agent I, a mixture of
  32.7 g of hexanediol dimethacrylate and
  8 g of 1-[2-methacryloyloxyethyl]-4-methacryloyloxy-2,2,6,6-tetramethylpiperidine and, in place of mixture IV,
  255.8 g of butyl acetate
are employed.

After carrying out the reaction in a manner analogous in other respects, a polymer microparticle dispersion is obtained which is stabilized with 2.4% of light stabilizer, relative to the total solids content. The stabilizer is incorporated in the "arms" and in the "core" of the microgels.

$\overline{M}n=9{,}994$, $\overline{M}w=25{,}060$.

Example 15

The same apparatus with the same preparations as described in Example 1 is again used. Under argon,
  176 g of ethylene glycol dimethyl ether
  2 g of xylene and 1.3 g of 1-trimethylsiloxy-1-isobutoxy-2-methylpropene are put into the reaction flask.

50 μl of a 1M solution of tetrabutylammonium bifluoride (TBAHF$_2$) in ethylene glycol dimethyl ether are added through the rubber diaphragm by means of a syringe.

The mixture is then stirred under argon and the following components are added successively in accordance with the precise time schedule given below. The addition is made by means of two independent metering pumps.

| Components | Time in minutes | |
|---|---|---|
| | start of addition | end of addition |
| I 200 μl of 1M TBAHF$_2$ and 2 g ethylene glycol dimethyl ether | 0 | 90 |
| II mixture of | | |
| 62.3 g of methylmethacrylate and 1.3 g of 4-methacryloyloxy-1,2,2,6,6-pentamethylpiperidine | 0 | 15 |
| III 4.3 g of ethylene glycol dimethacrylate | 30 | 40 |
| IV 58 g of 2-ethylhexyl methacrylate and 1.2 g of 4-methacryloyloxy-1,2,2,6,6-pentamethylpiperidine | 50 | 65 |

After a reaction time of 100 minutes, the polymerization is stopped by the addition of 2 g of methanol. The resulting polymer microparticle dispersion has a solids content of 41.2% and contains about 2% of light stabilizer, relative to the total solids content.

Example 16

Using the same quantity of 2- 2-hydroxy-5-[2-(2-acryloyloxy-cyclohexyloxycarbonyl)-ethyl]-phenyl -benzotriaole in place of 4-methacryloyloxy-1,2,2,6,6-pentamethylpiperidine and following the procedure of Example 15 in other respects, a light-stabilized polymer microparticle dispersion is likewise obtained which contains about 2% of UV absorber, relative to the total solids content.

Example 17

The same apparatus with the same preparations as in Example 1 is used.

Under argon, 353 g of dimethoxyethane (absolutely dry)

2 ml of 1-methoxy-2-methyl-1-trimethylsiloxypropene and 2.4 ml of a 0.05M TASHF$_2$ solution are put into the reaction vessel.

The following components are then added dropwise in accordance with the following precise time schedule:

| Components (mixtures) | Time in minutes | |
|---|---|---|
| | start of addition | end of addition |
| I 8 ml of 0.05 M TASHF$_2$ solution | 0 | 90 |
| II 124 g (132 ml) of methyl methacrylate | 0 | 15 |
| III Mixture consisting of | 0 | 15 |
| 4.3 g of ethylene glycol dimethacrylate and 7.4 g of 1-[2-methacryloyloxyethyl]-4-methacryloyloxy-2,2,6,6-tetramethylpiperidine | 30 | 40 |
| IV 115.8 g of 2-ethylhexyl methacrylate | 50 | 65 |

The reaction is strongly exothermic, so that it is cooled with ice/water to maintain an internal temperature of 65° C. After a reaction time of 100 minutes, the reaction in the slightly yellowish, viscous polymer microparticle solution is stopped by means of 20 ml of methanol. The microparticles can be precipitated from hexane or methanol. This gives about 71.4 g·of polymer microparticles stabilized in the "core". The light stabilizer content is 3%, relative to the total solids content.

Example 18

Using a mixture consisting of 124 g of methyl methacrylate and 7.4 g of 4-methacryloyloxy-1,2,2,6,6-pentamethylpiperidine in place of component II in Example 17 and 8.8 g of ethylene glycol dimethacrylate in place of the mixture III and exactly following the procedure of Example 17 in other respects, 60 g of white stabilized polymer microparticles are obtained which contain 3% of light-stabilizer, relative to the total solids content, in the "arms".

Example 19

Using a mixture consisting of 124 g of methyl methacrylate and 7.4 g of 4-methacryloyloxy-1,2,2,6,6-pentamethylpiperidine in place of component II in Example 17 and exactly following the detailed procedure of Example 17 in other respects, 110 g of white stabilized polymer microparticles are obtained which contain 3% of light stabilizer, relative to the total solids content, both in the "arms" and in the "core".

Example 20

Exactly following the procedure of Example 17, the following components are put into the reaction flask in accordance with the following time schedule:

| Components | Time in minutes | |
|---|---|---|
| | start of addition | end of addition |
| I 8 ml of 0.05 M TASHF$_2$ solution | 0 | 90 |
| II 124 g (132 ml) of methyl methacrylate 4.8 g of 4-methacryloyloxy-1,2,2,6,6-pentamethylpiperidine (a) | 0 | 15 |
| III 8.6 g of ethylene glycol dimethacrylate 0.26 g of 1-[2-methacryloyloxyethyl]-4-dine (b) | 30 | 40 |
| IV 115.8 g of 2-ethylhexyl methacrylate | 50 | 65 |
| V 7.6 g of 2- 2-hydroxy-3-t-butyl-5-[2-(2-methacryloyloxy-cyclohexyloxycarbonyl)-ethyl]-phenyl -benzotriazole dissolved in 20 ml of dimethoxyethane (c) | 65 | 90 |

After a total reaction time of 105 minutes, the reaction is stopped with 20 ml of methanol and the product is precipitated in hexane or methanol. This gives a white microgel which contains 2% of light stabilizer (a), relative to the solids content of the "arms", in the "arms" and 3% of light stabilizer (b), relative to the solids content of the "cores", in the "cores", and 3% of the UV absorber (c), relative to the total solids content, in the "arms", as proved by a UV spectrum of a microgel solution in CHCl$_3$.

Example 21

The apparatus used is a 2.5 liter sulfonation flask fitted with a stirrer, reflux condenser, thermometer and rubber diaphragm inlet. The flask is flame-heated in vacuo and filled with dry argon gas. The sulfonation flask is then charged with the following components, always under argon:

1,189.00 g of ethylene glycol dimethyl ether
15.54 g of xylene and
14.00 g of 1-trimethylsiloxy-1-isobutoxy-2-methylpropene.

100 μl of a 1.0 molar solution of tetrabutylammonium bifluoride (TBAHF$_2$) in ethylene glycol dimethyl ether are added to this mixture through the rubber diaphragm by means of a syringe.

This reaction mixture is stirred under argon. The following components are then added to the reaction flask through the rubber diaphragm by means of two different metering pumps in accordance with a precise time schedule (see below):

| Components | Time in minutes | |
|---|---|---|
| | start of addition | end of addition |
| I 300 μl of 1.0 M TBAHF$_2$ and 5.3 g of ethylene glycol dimethyl ether | 0 | 90 |
| II Mixture of | | |
| 844.4 g of methyl methacrylate and 18.0 g of 4-acryloyloxy-1,2,2,6,6-pentamethylpiperidine | 0 | 40 |
| III 55.8 g of ethylene glycol dimethacrylate | 55 | 70 |

After a total reaction time of 100 minutes, the reaction is stopped with 20 g of methanol.

The resulting polymer microparticle dispersion has a solids content of 43.5%, containing about 2% of light stabilizer, relative to the total solids content.

Example 22

The same apparatus with the same preparations as in Example 21 is used again. Under argon, 700.0 g of tetrahydrofuran (THF) (made absolutely dry over potassium)
5.0 g of xylene (absolutely dry) and
7.0 g of 1-trimethylsiloxy-1-methoxy-2-methylpropene are added to the reaction flask.

50 μl of a 1M tris(dimethylamino)-sulfonium bifluoride solution (TASHF$_2$) in ethylene glycol dimethyl ether are added to this mixture through the rubber diaphragm by means of a syringe.

| Components | Time in minutes | |
|---|---|---|
| | start of addition | end of addition |
| I 40.7 g of hexanediol dimethacrylate | 0 | 10 |
| II 400 μl of 1.0 M TASHF$_2$ solution and 4.1 g of THF | 0 | 90 |
| III Mixture of | | |
| 199.5 g of methyl methacrylate and 4.0 g of 4-acryloyloxy-1,2,2,6,6-pentamethylpiperidine | 40 | 55 |
| IV Mixture of | | |
| 255.8 g of butyl acrylate and 5.2 g of 4-acryloyloxy-1,2,2,6,6-pentamethylpiperidine | whole quantity after 85 minutes | |

After a reaction time of 2 hours, the polymerization is stopped by the addition of 100 g of methanol.

This gives a polymer microparticle dispersion having a solids content of about 41.9%, containing 1.8% of light stabilizer, relative to the total solids content.

Example 23

Using the same quantity of 2- 2-hydroxy-3-tert-butyl-5-[2-(2-acryloyloxy-cyclohexyloxycarbonyl)-ethyl]-phenyl -benzotriazole in place of 4-acryloyloxy-1,2,2,6,6-pentamethylpiperidine and exactly following the procedure of Example 21 in other respects, a polymer microparticle dispersion stabilized against UV light is likewise obtained.

Example 24

Using the same quantity of 2- 2-hydroxy-3-tert-butyl-5-[2-(2-acryloyloxy-propyloxycarbonyl)-ethyl]-phenyl -benzotriazole in place of 4-acryloyloxy-1,2,2,6,6-pentamethylpiperidine and exactly following the procedure of Example 22 in other respects, a polymer microparticle dispersion stabilized against UV light is likewise obtained.

Example 25

Using the same quantity of 2- 2-hydroxy-3-tert-butyl-5-[2-(2-acryloyloxy-cyclohexyloxycarbonyl)-ethyl]-phenyl -benzotriazole in addition to the 18.0 g of 4-acryloyloxy-1,2,2,6,6-pentamethylpiperidine and exactly following the procedure of Example 21 in other respects, a light-stabilized polymer microparticle dispersion which contains about 2% each, relative to the solids content, of benzotriazole UV absorber and 4-acryloyloxy-1,2,2,6,6-pentamethylpiperidine is likewise obtained.

Example 26

The same apparatus with the same preparations as described in Example 21 is again used. Under argon, 176 g of ethylene glycol dimethyl ether
2 g of xylene and
1.3 g of 1-trimethylsiloxy-1-isobutoxy-2-methylpropene are put into the reaction flask.

50 μl of a 1M solution of tetrabutylammonium bifluoride (TBAHF$_2$) in ethylene glycol dimethyl ether are added through the rubber diaphragm by means of a syringe.

The mixture is then stirred under argon and the following components are added successivey in accordance with the precise time schedule given below. Two independent metering pumps are used for the addition.

| Components | Time in minutes | |
|---|---|---|
| | start of addition | end of addition |
| I 200 μl of 1 M TBAHF$_2$ and 2 g of ethylene glycol dimethyl ether | 0 | 90 |
| II Mixture of | | |
| 62.3 g of methyl methacrylate and 1.3 g of 4-acryloyloxy-1,2,2,6,6-pentamethylpiperidine | 0 | 15 |
| III 4.3 g of ethylene glycol dimethacrylate | 30 | 40 |
| IV 58 g of 2-ethylhexyl methacrylate and 1.2 g of 4-acryloyloxy-1,2,2,6,6-pentamethylpiperidine | 50 | 65 |

After a reaction time of 100 minutes, the polymerization is stopped by the addition of 2 g of methanol. The resulting polymer microparticle dispersion has a solids content of 41.2% and contains about 2% of light stabilizer, relative to the total solids content.

Example 27

The light-stabilized star microparticles obtained according to Examples 1–20 are processed in a curable coating composition.

The respective microparticles are, as an about 30% solution in butyl acetate, incorporated into an acrylate/melamine clear coat in such a way that their content corresponds to 15% (relative to the solids content of the clear coat).

| The clear coat used has the following composition | |
|---|---|
| | Parts |
| ®Uracron 2263 XB (50%), acrylate resin from DSM Resins BV, Netherlands | 59.2 |
| ®Cymel 327 (90%), melamine resin from American Cyanamide Corporation | 11.6 |
| Butylglycol acetate | 5.5 |
| Xylene | 19.4 |
| Butanol | 3.3 |
| ®Baysilon A (1% in xylene), flow aid from Bayer AG, Germany | 1.0 |
| | 100 |

The coating composition obtained is diluted with a 13:6:1 mixture of xylene/butanol/butylglycol acetate up to sprayability, sprayed onto a prepared aluminium sheet (coil coat, filler, silver-metallic basecoat) and baked at 130° C. for 30 minutes. This gives a dry film thickness of about 45 μm of clear coat.

A coating mixture, which contains unstabilized microparticles (prepared without addition of light stabilizer) in the same quantitative ratio, but in other respects is prepared and applied in the same way as above, is used as a comparison.

The specimens are tested both by accelerated weathering (®UVCON or ®Xenon weatherometer from Atlas Corporation) and by outside weathering in Florida. The stabilized specimens each show better gloss retention and longer freedom from cracks than the unstabilized comparison specimen.

Example 28

The procedure followed is as in Example 27, but with the difference that the respective microparticles are not added to the finished coating mixture described in Example 27 but, instead, 15% (relative to solids content) of the acrylate component ®Uracron 2263 XB are replaced by the respective microparticles. The coating mixture is processed and tested as in Example 27.

The stabilized specimens again show better gloss retention and longer freedom from cracks than the unstabilized comparison specimen.

What is claimed is:

1. Light-stabilized star polymer microparticles containing
   (a) a polymer core of 1–100% by weight of one or more monomers which contain at least 2 groups of the formula

(1)

and 0–99% by weight of one or more monomers which contain one group of the formula (1), and
   (b) at least 5 arms, fixed to the polymer core, of polymer chains consisting of one or more monomers which contain a group of the formula (1), R in the formula (1) being H, CH$_3$, CH$_3$CH$_2$, CN or COOR', Z$^1$ being O or NR' and R' being C$_1$–C$_4$alkyl, at least 50% of the microparticles having at least 5 up to 2,000,000 such arms, these arms consisting of one or more groups of different polymer types, and
   (α) the polymer chains of one of the said groups of arms having molecular weights which are the same as or different from those of the other groups, and being derived from the same monomers as the polymer chains of the other groups of arms, or from monomers differing from these,
   (β) the polymer chains of each group of arms having an arm polydispersity of 1.0 to 2.0, this polydispersity being defined by the weight average divided by the number average of the polymer chains in the group, and
   (γ) the star polymer microparticles themselves, which contain a core and arms consisting of one or more groups, having a polydispersity of 1.0 to 2.0, this polydispersity being defined by the weight average divided by the number average of the microparticles, which polymer microparticles contain 0.1 to 30% by weight, relative to the monomer employed, of one or more light stabilizers, at least a part of the polymerization of the monomers being carried out in the presence of the light stabilizer.

2. Microparticles according to claim 1, wherein the polydispersity of the arms is 1.3 to 1.6 and the polydispersity of the microparticles is also 1.3 to 1.6.

3. Microparticles according to claim 1, which contain one group of arms.

4. Microparticles according to claim 1, which contain 2 different groups of arms.

5. Light-stabilized, soluble, star polymer microparticles containing
   (a) a crosslinked core containing a polymer of a mixture of 1–100% by weight of one or more monomers which contain at least 2 groups of the formula

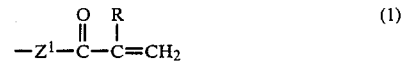

(1)

and 0–99% by weight of one or more monomers whichcontain one group of the formula (1), and
   (b) at least 5 arms, fixed to the polymer core, of polymer chains derived from one or more monomers which contain a group of the formula (1), RF in the formula (1) being H, CH$_3$, CH$_3$CH$_2$, CN or COOR', Z$^1$ being O or NR' and R' being C$_1$–C$_4$alkyl, at least 50% of the microparticles having at least 5 up to 2,000,000 arms, the ratio of the number of arms to the number of bifunctional recurring acrylic units in the core being ≦1:1, which polymer microparticles contain 0.1 to 30% by weight, relative to to the monomer employed, of one or more light stabilizers, at least a part of the polymerization of the monomers being carried out in the presence of the light stabilizer.

6. Microparticles according to claim 5, obtained by polymerization in the presence of a polymerization initiator, the molar initiator: difunctional acrylic monomer ratio being ≦1:1.

7. Light-stabilized, "living", star polymer microparticles, containing (a) a crosslinked core containing a polymer of a mixture of 1-100% by weight of a monomer having at least 2 C—C double bonds polymerizable by group transfer polymerization and 0-99% by weight of a monomer having one C—C double bond polymerizable by group transfer polymerization, (b) at least 5 arms fixed to the polymer core and containing polymer chains consisting of one or more monomers polymerizable by group transfer polymerization, and (c) "living" group transfer polymerization centres which are bonded to the core or/and to at least some of the arms and are capable of further polymerization, which polymer microparticles contain 0.1 to 30% by weight, relative to the monomer employed, of one or more light stabilizers, at least a part of the polymerization of the monomers being carried out in the presence of the light stabilizer.

8. Star polymer microparticles, obtainable by deactivation of the "living" microparticles according to claim 7 by means of a reagent which deactivates the "living" groups of the group transfer polymerization centres, which polymer microparticles contain 0.1 to 30% by weight, relative to the monomers employed, of one or more light stabilizers.

9. Microparticles according to claim 8, wherein the light stabilizers contain(s) at least one reactive group, by means of which it can be chemically bonded to the polymer.

10. Microparticles according to claim 1, wherein the reactive groups are ethylenic double bonds.

11. Microparticles according to claim 1, wherein the light stabilizer used is at least one compound from the class of sterically hindered amines.

12. Microparticles according to claim 11, wherein the light stabilizer used is a 2,2,6,6-tetraalkylpiperidine derivative which, in its molecule, contains at least one group of the formula I

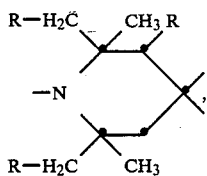

in which R is hydrogen or methyl.

13. Microparticles according to claim 1, wherein the light stabilizer is a UV absorber.

14. Microparticles according to claim 1, wherein a UV absorber and a sterically hindered amine are employed as the light stabilizer.

15. Microparticles according to claim 13, wherein the UV absorber belongs to the class of 2-(2-hydroxyphenyl)-benzotriazoles.

16. An arm/core process for the preparation of light-stabilized, star polymer microparticles, in which (a) a "living" polymer is prepared by reacting a group transfer initiator with one or more monomers having a C—C double bond capable of group transfer polymerization, and (b) the resulting "living" polymer is reacted with a mixture which contains 1-100% by weight of a monomer having at least 2 C—C double bonds polymerizable by group transfer polymerization and 0-99% by weight of a monomer having one C—C double bond polymerizable by group transfer polymerization, which comprises carrying out step (a) or/and (b) in the present of 0.1 to 30% by weight, relative to the monomers, of one or more light stabilizer.

17. A core/arm process for the preparation of light-stabilized, star polymer microparticles, in which (a) a "living" core is prepared by reacting a group transfer initiator with a mixture containing 1-100% by weight of a monomer having at least 2 C—C double bonds polymerizable by group transfer polymerization and 0-99% by weight of a monomer having one C—C double bond polymerizable by group transfer polymerization, and (b) the resulting "living" core is reacted with one or more monomers having a C—C double bond polymerizable by group transfer polymerization, and which comprises carrying out step (a) or/and (b) in the presence of 0.1 to 30% by weight, relative to the monomers, of one or more light stabilizer.

18. An arm/core/arm process for the preparation of light-stabilized, star polymer microparticles, in which (a) a "living" polymer is prepared by reacting a group transfer initiator with one or more monomers having a C—C double bond polymerizable by group transfer polymerization, (b) the resulting "living" polymer is reacted with a mixture containing 1-100% by weight of a monomer having at least 2 C—C double bonds polymerizable by group transfer polymerization and 0-99% by weight of a monomer having one C—C double bond polymerizable by group transfer polymerization, in such a way that "living" star polymer microparticles with "living" group transfer polymerization centres in the core are obtained, and (c) the "living" polymers thus obtained are reacted with one or more monomers which contain a C—C double bond and which are polymerizable by group transfer polymerization, these monomers being identical to or different from those employed in step (a), which comprises carrying out step (a), (b) or/and (c) in the presence of 0.1 to 30% by weight, relative to the monomers, of one or more light stabilizer.

19. A process according to claim 16, wherein, after the polymerization, the "living" groups of the group transfer polymerization centres are deactivated by means of a deactivating agent.

20. A coating composition, wherein the film-forming material comprises (a) 1 to 95% by volume of a disperse phase which contains microparticles according to claim 1, and (b) 99 to 5% by volume of a liquid continuous phase which has a viscosity of 0.1 to 30 poise at room temperature and is capable of curing to give a film-forming polymer, the total volume of (a) and (b) being 100%.

21. A coating composition according to claim 20, wherein the film-forming material comprises (a) 5-85% by volume of the disperse phase containing at least 50% by volume of microparticles according to the invention and (b) 95-15% by volume of the liquid continuous phase having a viscosity of 0.1 to 20 poise at room temperature.

22. A coating composition according to claim 20, wherein the continuous phase (b) also contains one or more light stabilizers.

23. A coating composition according to claim 20, wherein the liquid continuous phase (b) contains a thermosetting resin.

24. A coating composition according to claim 23, wherein the resin is a crosslinkable acrylic resin, polyester/alkyd resin or polyurethane resin, which may have been crosslinked with aminoplasts, polyisocyanate or polyepoxides.

25. A coating composition according to claim 20, wherein the liquid continuous phase (b) contains a reactive diluent which is itself not curable but contains reactive groups, by means of which it can participate in the curing of the film-forming material.

26. A process according to claim 19 wherein said deactivating agent is a proton donor compound.

27. A process according to claim 17, wherein, after the polymerization, the "living" groups of the group transfer polymerization centres are deactivated by means of a deactivating agent.

28. A process according to claim 18, wherein, after the polymerization, the "living" groups of the group transfer polymerization centres are deactivated by means of a deactivating agent.

29. A coating composition, wherein the film-forming material comprises
 (a) 1 to 95% by volume of a disperse phase which contains microparticles according to claim 8 and
 (b) 99 to 5% by volume of a liquid continuous phase which has a viscosity of 0.1 to 30 poise at room temperature and is capable of curing to give a film-forming polymer, the total volume of (a) and (b) being 100%.

* * * * *